(12) United States Patent
Alpcan et al.

(10) Patent No.: US 7,912,212 B2
(45) Date of Patent: Mar. 22, 2011

(54) SYMMETRIC CRYPTOSYSTEM USING CASCADED CHAOTIC MAPS

(75) Inventors: Tansu Alpcan, Urbana, IL (US); Tamer Basar, Champaign, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 1358 days.

(21) Appl. No.: 11/343,953

(22) Filed: Jan. 31, 2006

(65) Prior Publication Data

US 2008/0063185 A1  Mar. 13, 2008

(51) Int. Cl.
*H04K 1/00* (2006.01)
*H04L 9/00* (2006.01)

(52) U.S. Cl. .......................................... 380/28; 380/263
(58) Field of Classification Search .................... 380/37, 380/42, 263
See application file for complete search history.

(56) References Cited

U.S. PATENT DOCUMENTS

| | | | |
|---|---|---|---|
| 5,048,086 A * | 9/1991 | Bianco et al. | 380/28 |
| 5,379,346 A * | 1/1995 | Pecora et al. | 380/263 |
| 5,479,513 A * | 12/1995 | Protopopescu et al. | 380/28 |
| 5,696,826 A * | 12/1997 | Gao | 380/28 |
| 6,014,445 A * | 1/2000 | Kohda et al. | 380/28 |
| 6,049,614 A * | 4/2000 | Kim | 380/263 |
| 6,064,738 A * | 5/2000 | Fridrich | 380/28 |
| 6,094,483 A * | 7/2000 | Fridrich et al. | 380/28 |
| 6,587,563 B1 | 7/2003 | Crandall | |
| 6,892,940 B2 * | 5/2005 | Kocarev et al. | 235/380 |
| 6,952,477 B1 * | 10/2005 | Lotspiech | 380/37 |
| 7,095,850 B1 * | 8/2006 | McGrew | 380/42 |
| 2003/0007635 A1 * | 1/2003 | Li et al. | 380/28 |
| 2003/0007639 A1 * | 1/2003 | Lambert | 380/263 |
| 2003/0053625 A1 * | 3/2003 | Bially et al. | 380/42 |
| 2003/0108197 A1 * | 6/2003 | Crandall | 380/46 |
| 2003/0219120 A1 * | 11/2003 | Kocarev et al. | 380/28 |
| 2004/0223616 A1 * | 11/2004 | Kocarev et al. | 380/263 |

OTHER PUBLICATIONS

Roskin et al., From Chaos to Cryptography, 1999, pp. 1-9.*
Shujun Li, Analyses and New Designs of Digital Chaotic Ciphers, Apr. 2004, Chapter 2 and 3, pp. 1-65.*
Alvarez, G., "Cryptanalysis of an ergodic chaotic cipher", www.sciencedirect.com, Mar. 16, 2003, 8 pages.
Alvarez, G. et al. "Keystream cryptanalysis of a chaotic cryptographic method", www.sciencedirect.com, Aug. 14, 2003, 3 pages.
Baptista, M.S. "Cryptography with chaos", Elsevier Science, Physics Letters A 240 (1998), pp. 50-54.
Dachselt, Frank et al., "Chaos and Cryptography", IEEE Transactions on Circuits and Systems I: Fundamental Theory and Applications, vol. 48, No. 12, Dec. 2001, pp. 1498-1509.
Even, S. et al., "On the Power of Cascade Ciphers", ACM Transactions on Computer Systems, vol. 3, No. 2, May 1985, pp. 108-116.
Kocarev, Ljupco "Chaos-Based Cryptography: A Brief Overview", IEEE, 2001, 16 pages.
Li, Shujun et al., "Baptista-type chaotic cryptosystems: Problems and countermeasures", Elsevier Science, Nov. 3, 2004, 13 pages.

(Continued)

*Primary Examiner* — Christopher A Revak
*Assistant Examiner* — Abdullah Almamun

(57) ABSTRACT

A symmetric cryptosystem uses cascaded chaotic maps to encrypt plaintext and decrypt ciphertext. Received plaintext is encrypted using the cascaded chaotic maps to generate a ciphertext. The ciphertext can then be decrypted using the same cascaded chaotic maps in order to retrieve the plaintext.

30 Claims, 14 Drawing Sheets

OTHER PUBLICATIONS

Li, Shujun et al., "On the Dynamical Degradation of Digital Piecewise Linear Chaotic Maps", International Journal of Bifurcation and Chaos, vol. 15, No. 10, 2005, 29 pages.

Murali, K. "Heterogeneous chaotic systems based cryptography", Elsevier Science, Physics Letters A 272 (2000), pp. 184-192.

Palacios, A. et al. "Cryptography with Cycling Chaos", Elsevier Science, Jun. 26, 2002, 10 pages.

Roskin, K.M. et al., "From Chaos to Cryptography", 9 pages.

Li, S., "Analyses and new designs of digital chaotic ciphers", Ph.D. dissertations, School of Electronics and Information Engineering, Xian Jiaotong University, Xian, China, Jun. 2003, available online at http://www.hooklee.com/pub.html, 208 pages.

Maurer, M. et al., "Cascade ciphers: The importance of being first", Journal of Cryptology, vol. 6, No. 1, p. pp. 5561, 1993, 8 pages.

* cited by examiner

SYMMETRIC CRYPTOSYSTEM USING CASCADED CHAOTIC MAPS

BACKGROUND

Computers and computing devices (e.g., PDAs, smartphones, digital cameras, audio players and recorders, etc.) are becoming increasingly commonplace in homes, businesses, educational facilities, public facilities, and so forth throughout the world. With this increase has also come an increase in the need for security. Oftentimes, computer users have digital information stored on their computers or digital information in the form of (including but not limited to) documents, electronic mail, pictures, audio, and movies to be transferred to other computers that they desire to keep secret, or desire to allow only select other users to be able to read. Various cryptographic algorithms have been developed to allow such security to be maintained.

One class of cryptographic algorithms is referred to as symmetric key algorithms. In symmetric key algorithms, the same key(s) is used for encryption and decryption of information. Information to be kept secret is encrypted using a key(s), and then can be decrypted only by another user that knows the decryption algorithm to use and the key(s) that was used to encrypt the information.

One problem with cryptographic algorithms is that as computers have become increasingly powerful, malicious users are able to use this increased power to attempt to break or crack the cryptographic algorithms. Once broken or cracked, the malicious user can read the encrypted information, so it is no longer kept secret. In light of malicious users' attempts to break or crack cryptographic algorithms, it would be beneficial to increase the different cryptographic algorithms available to users, and to develop new types of cryptographic algorithms in order to stay ahead of such malicious users.

SUMMARY

A symmetric cryptosystem using cascaded chaotic maps is discussed herein.

In accordance with certain aspects of the cryptosystem, plaintext to be encrypted is received. The received plaintext is then encrypted using one or more cascaded chaotic maps.

In accordance with certain aspects of the cryptosystem, ciphertext to be decrypted is received. The received ciphertext is then decrypted using one or more cascaded chaotic maps.

BRIEF DESCRIPTION OF THE DRAWINGS

The same numbers are used throughout the document to reference like components and/or features.

DETAILED DESCRIPTION

Figure 1:
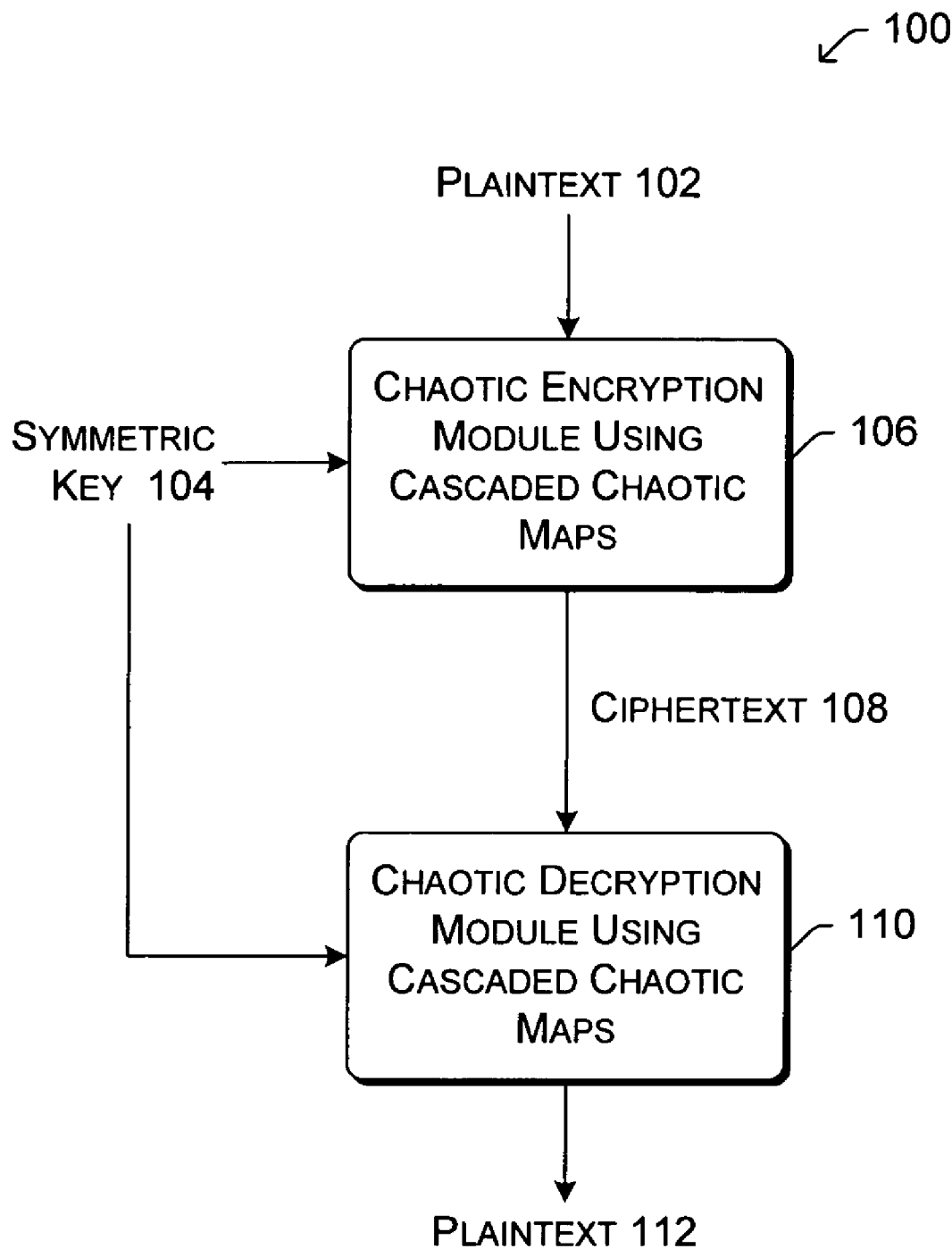
FIG. 1 illustrates an example cryptosystem using cascaded chaotic maps.

FIG. 1 illustrates an example cryptosystem 100 using cascaded chaotic maps. In cryptosystem 100, plaintext 102 as well as a symmetric key 104 is input to a chaotic encryption module 106. Encryption module 106 uses symmetric key 104 to encrypt plaintext 102 using a chaotic encryption technique that uses cascaded chaotic maps. The encrypted plaintext 102 is output by encryption module 106 as ciphertext 108.

Ciphertext 108 as well as symmetric key 104 can subsequently be input to chaotic decryption module 110. Decryption module 110 uses symmetric key 104 to decrypt ciphertext 108 using a chaotic decryption technique that uses cascaded chaotic maps. The decrypted ciphertext 108 is output by decryption module 110 as plaintext 112. Plaintext 112 is the same as plaintext 102.

As ciphertext 108 is the encrypted version of plaintext 102, ciphertext 108 can be stored and/or transferred different places without concern over whether unauthorized users (those without knowledge of symmetric key 104) are able to decrypt the ciphertext. However, any authorized user will have symmetric key 104 and is able to decrypt the ciphertext in order to recover plaintext 102.

Encryption module 106 and decryption module 110 can be implemented on the same computing device or alternatively on different computing devices. Additionally, encryption module 106 and decryption module 110 can be implemented in software, firmware, hardware, or combinations thereof.

A cascaded chaotic map has multiple levels of chaotic maps, with the output of the chaotic map at each level being dependent in part on the output(s) of the chaotic map(s) at one or more previous levels. Cascaded chaotic maps are also referred to herein as K-cascaded chaotic maps, with K representing the number of levels of chaotic maps. A K-cascaded chaotic map, also referred to as $F_{KCCM}(x(n),p_0)$, generates an output value $x(n+1)$ and is defined as follows:

$$x_1(n+1) = F_1(x_1(n), p_0)$$

$$x_2(n+1) = F_2(x_2(n), x_1(n+1))$$

.

.

.

$$x_{K-1}(n+1) = F_{K-1}(x_{K-1}(n), x_{K-2}(n+1))$$

$$x(n+1) = F_{PWL}(x(n), x_{K-1}(n+1)) \quad (1)$$

In the K-cascaded chaotic map, the values $p_0, x_1(0), \ldots, x_{K-1}(0)$ are the initial conditions and parameters of the K-cascaded chaotic map. These initial conditions and parameters for the various K-cascaded chaotic maps in a cryptosystem are also the symmetric key for the crypto system, as discussed in more detail below.

Each of the functions $F_1(\ ), F_2(\ ), \ldots, F_{K-1}(\ )$ represents a chaotic map. Each of these functions can be a different chaotic map, or alternatively one or more of these functions can be the same chaotic map. Any chaotic map that maps input values [0,1] to values [0,1] can be used as these functions $F_1(\ ), F_2(\ ), \ldots, F_{K-1}(\ )$. In certain embodiments the function $F_{PWL}(\ )$ is used as the chaotic map for all of the functions $F_1(\ ), F_2(\ ), \ldots, F_{K-1}(\ )$. The function $F_{PWL}(\ )$ is referred to as the piecewise linear chaotic map (PWLCM) and is defined as follows:

$$F_{PWL}(x(n), p) = \begin{cases} \frac{x(n)}{p}, & \text{if } x \in [0, p] \\ \frac{1 - x(n)}{1 - p}, & \text{if } x \in [p, 1] \end{cases} \quad (2)$$

In the function $F_{PWL}(\ )$, the value p is referred to as a control parameter, and 0<p<1. The value n in the function $F_{PWL}(\ )$ as well as the K-cascaded chaotic map of (1) refers to the iterations of the K-cascaded chaotic map. The K-cascaded chaotic map can be iterated different numbers of times in the cryptosystem, as discussed in more detail below. When performing multiple iterations, multiple sets of initial conditions and parameters (i.e., multiple key(s)) are input to the K-cascaded chaotic map. Typically a different set of initial conditions and parameters are used for each iteration, although alternatively the same set of initial conditions and parameters can be used for multiple iterations.

Additionally, in certain embodiments, the output of one iteration of the K-cascaded chaotic map may be used as an input in the next iteration. For example, the output of one iteration of the K-cascaded chaotic map may be used as one or more of the initial conditions and parameters for the next iteration of the K-cascaded chaotic map. Furthermore, these initial conditions and parameters may be mixed according to a certain scheme before utilization as input in the next iteration.

The cascaded chaotic maps discussed herein can include two or more levels of chaotic maps. In certain embodiments, the cascaded chaotic maps discussed herein include three levels of chaotic maps (a 3-cascaded chaotic map), although four or more levels of chaotic maps may alternatively be included.

Figure 2:
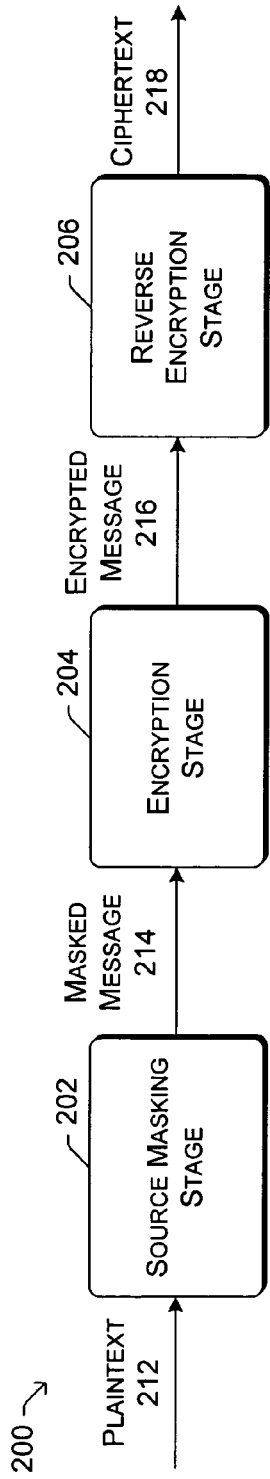
FIG. 2 is a block diagram illustrating an example multistage chaotic encryption technique.

FIG. 2 is a block diagram illustrating an example multi-stage chaotic encryption technique 200. Multi-stage chaotic encryption technique 200 can be used, for example, by encryption module 106 of FIG. 1. Multi-stage chaotic encryption technique 200 includes a source masking stage 202, an encryption stage 204, and a reverse encryption stage 206.

Plaintext 212 is input to source masking stage 202. In source masking stage 202, a number of bytes are added to plaintext 212 and the result is masked using a cascaded chaotic map(s) and output as masked message 214. Masked message 214 is then input to encryption stage 204. Encryption stage 204 uses a cascaded chaotic map(s) to encrypt masked message 214 and generate an encrypted message 216. The encryption in stage 204 is performed in the forward direction (in other words, starting from the first byte of masked message 214 and working towards the last byte of masked message 214). Encrypted message 216 is output by encryption stage 204 and input to reverse encryption stage 206. Reverse encryption stage 206 uses a cascaded chaotic map(s) to encrypt encrypted message 216 in the reverse direction. In other words, reverse encryption stage 206 re-encrypts message 216 starting from the last byte of message 216 and working towards the first byte of message 216. Reverse encryption stage 206 outputs the re-encrypted message as ciphertext 218.

Each stage 202, 204, and 206 of multi-stage chaotic encryption technique 200 makes use of one or more cascaded chaotic maps. Different cascaded chaotic maps can be used in each stage 202, 204, and 206. Alternatively, the same cascaded chaotic map can be used in multiple stages 202, 204, and 206.

It should be noted that plaintext 212 may be the entire information to be encrypted (e.g., an entire message, an entire file, and so forth). Alternatively, plaintext 212 may be only a portion (also referred to as a block) of the entire information. For example, a large file may be separated into multiple blocks, and each of those blocks may be a separate plaintext 212 input to encryption technique 200. These blocks may be processed in parallel as described, or alternatively, in a series configuration where the symmetric keys of subsequent blocks are a function of (or depend on) the original symmetric key 104 of the first block that is processed.

It should also be noted that, although encryption technique 200 illustrates three different stages, one or more of these stages may alternatively be combined together into a single stage. Furthermore, in some implementations each of these stages may be repeated with different symmetric keys. Repeating stages with different symmetric keys increases the aggregate key size and enhances the security of the system.

Figure 3:
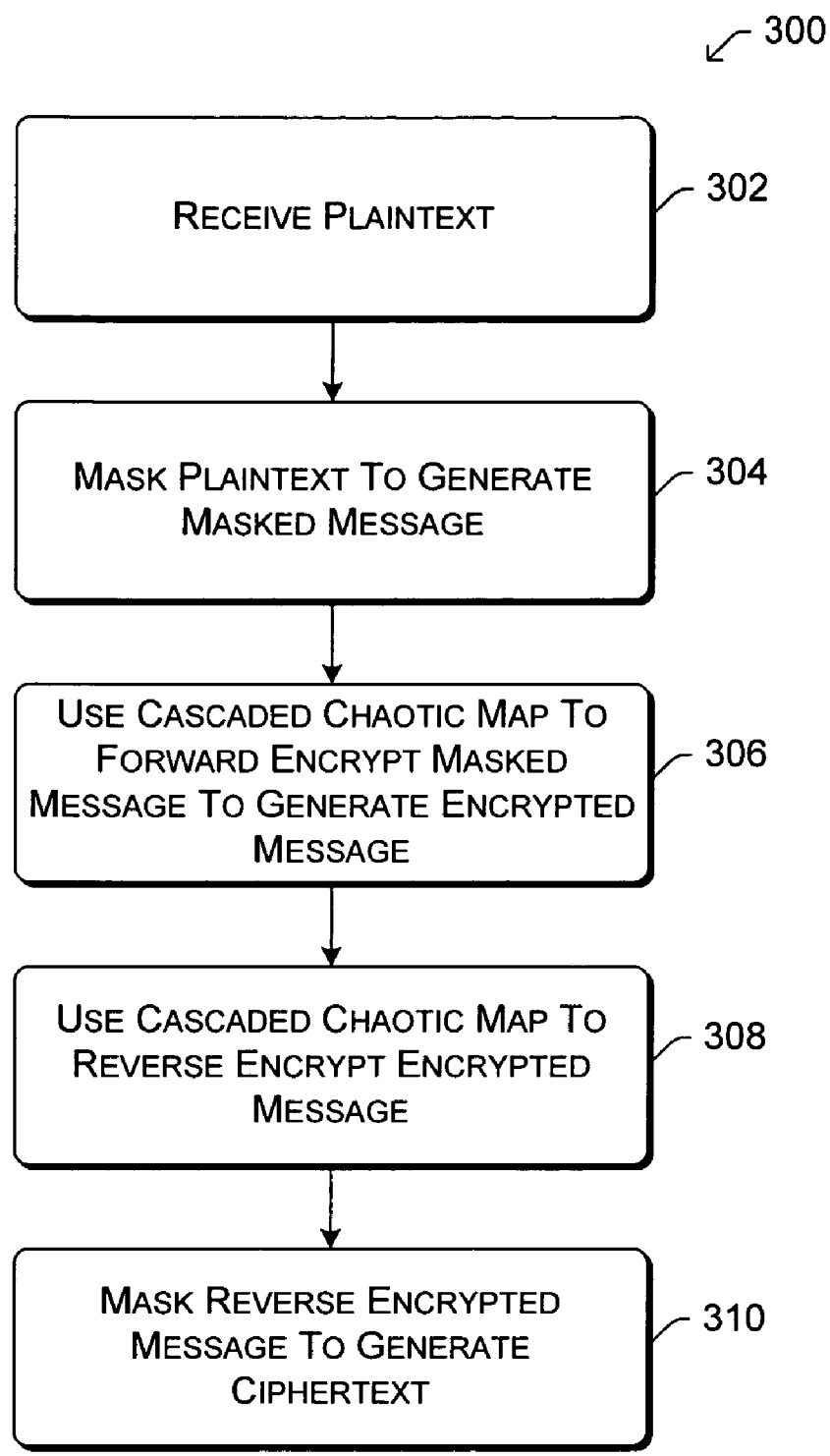
FIG. 3 is a flowchart illustrating an example encryption process using cascaded chaotic maps.

FIG. 3 is a flowchart illustrating an example encryption process 300 using cascaded chaotic maps. Encryption process 300 is performed by an encryption module, such as module 106 of FIG. 1. Encryption process 300 can be implemented in software, firmware, hardware, or combinations thereof.

Initially, plaintext to be encrypted is received (act 302). This plaintext can be an entire file, message, or other information to be encrypted, or alternatively a block of a larger amount of information to be encrypted. The plaintext is then masked (act 304). This masking in act 304 includes adding a number of bytes to the received plaintext, and then using a cascaded chaotic map(s) to transform the random bytes and received plaintext into a masked message.

A cascaded chaotic map(s) is then used to forward encrypt the masked message to generate an encrypted message (act 306). In act 306, the message is encrypted in the forward direction. In other words, the encryption in act 306 is performed starting from the first byte of the masked message and working towards the last byte of the masked message.

A cascaded chaotic map(s) is then used to reverse encrypt the forward encrypted message generated in act 306 (act 308). In act 308, the encrypted message generated in act 306 is encrypted again, but in the reverse direction. In other words, the encryption in act 308 is performed starting from the last byte of the encrypted message and working towards the first byte of the encrypted message.

The reverse encrypted message generated in act 308 is then masked to generate a ciphertext (act 310). The masking in act 310 uses a cascaded chaotic map(s) to transform the reverse encrypted message generated in act 308 into the ciphertext.

Figure 4:
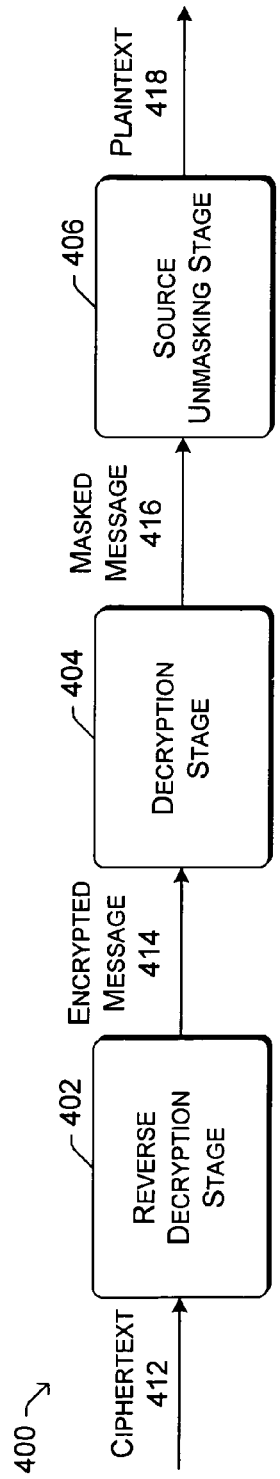
FIG. 4 is a block diagram illustrating an example multistage chaotic decryption technique.

FIG. 4 is a block diagram illustrating an example multi-stage chaotic decryption technique 400. Multi-stage chaotic decryption technique 400 can be used, for example, by decryption module 110 of FIG. 1. Decryption technique 400 is the reverse of encryption technique 200 of FIG. 2. Multistage chaotic decryption technique 400 includes a reverse decryption stage 402, a decryption stage 404, and a source unmasking stage 406.

Ciphertext 412 is input to reverse decryption stage 402. Reverse decryption stage 402 uses a cascaded chaotic map(s) to decrypt ciphertext 412 in the reverse direction. In other words, reverse decryption stage 402 decrypts ciphertext 412 starting from the last byte of ciphertext 412 and working towards the first byte of ciphertext 412. Reverse decryption stage 402 outputs the reverse decrypted message as encrypted message 414. Encrypted message 414 is then input to decryption stage 404. Decryption stage 404 uses a cascaded chaotic map(s) to decrypt encrypted message 414 and generate a masked message 416. The decryption in stage 404 is performed in the forward direction (in other words, starting from the first byte of encrypted message 414 and working towards the last byte of encrypted message 414). Masked message 416 is output by decryption stage 416 and input to source unmasking stage 406. In source unmasking stage 406, masked message 416 is unmasked using a cascaded chaotic map(s) and output as plaintext 418. In situations where ciphertext 412 is ciphertext 218 of FIG. 2, the resultant plaintext 418 is the same as plaintext 212 of FIG. 2.

Each stage 402, 404, and 406 of multi-stage chaotic decryption technique 400 makes use of one or more cascaded chaotic maps. Different cascaded chaotic maps can be used in each stage 402, 404, and 406. Alternatively, the same cascaded chaotic map can be used in multiple stages 402, 404, and 406.

It should be noted that ciphertext 412 may be the entire information to be decrypted (e.g., an entire encrypted message, an entire encrypted file, and so forth). Alternatively, ciphertext 412 may be only a portion (also referred to as a block) of the entire information.

It should also be noted that, although encryption technique 400 illustrates three different stages, one or more of these stages may alternatively be combined together into a single stage.

Figure 5:
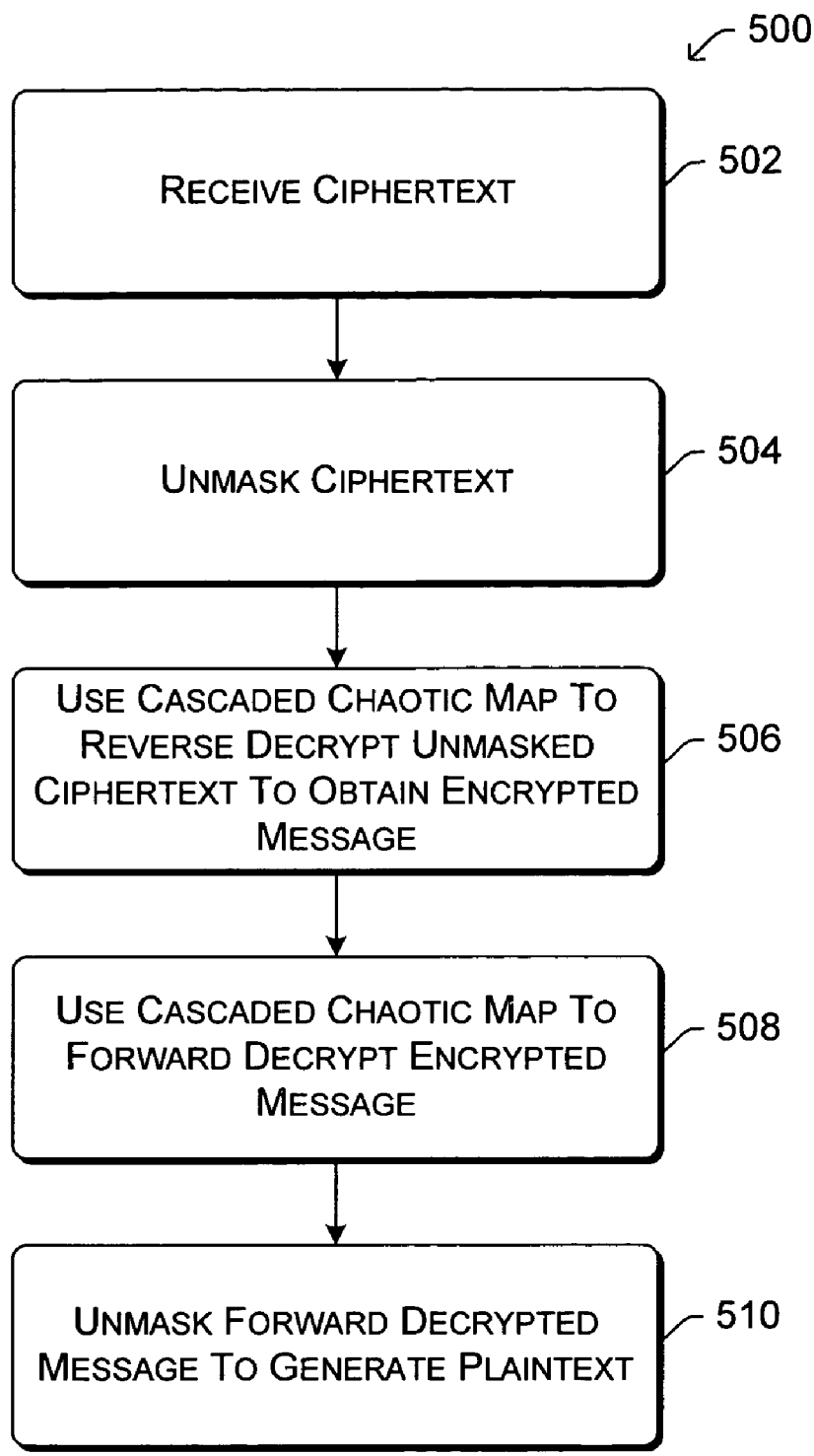
FIG. 5 is a flowchart illustrating an example decryption process using cascaded chaotic maps.

FIG. 5 is a flowchart illustrating an example decryption process 500 using cascaded chaotic maps. Decryption process 500 is performed by a decryption module, such as module 100 of FIG. 1. Decryption process 500 can be implemented in software, firmware, hardware, or combinations thereof.

Initially, ciphertext to be decrypted is received (act 502). This ciphertext can be an entire encrypted file, encrypted message, or other information to be decrypted, or alternatively a block of a larger amount of information to be decrypted. The received ciphertext is then unmasked (act 504). The unmasking in act 504 uses a cascaded chaotic map(s) to transform the ciphertext into an unmasked message.

A cascaded chaotic map(s) is then used to reverse decrypt the unmasked message generated in act 504 (act 506). In act 506, the unmasked message generated in act 504 is decrypted in the reverse direction. In other words, the decryption in act 506 is performed starting from the last byte of the unmasked message and working towards the first byte of the unmasked message. Reverse decrypting the unmasked message in act 506 results in an encrypted message.

A cascaded chaotic map(s) is then used to forward decrypt the encrypted message generated in act 506 (act 508). In act 508, the message is decrypted again, but this time in the forward direction. In other words, the decryption in act 508 is performed starting from the first byte of the encrypted message and working towards the last byte of the encrypted message. Decrypting the encrypted message in act 508 results in a decrypted message.

The decrypted message is then unmasked (act 510). This unmasking in act 510 includes using a cascaded chaotic map(s) to transform the decrypted message into plaintext, and then removing a number of bytes from the plaintext.

FIGS. 6-9 illustrate an example implementation of the encryption techniques and methods discussed above. The implementations of FIGS. 6-9 can be performed by software, firmware, hardware, or combinations thereof. Multiple cascaded chaotic maps are discussed in FIGS. 6-9. Each of these cascaded chaotic maps in FIGS. 6-9 may be different cascaded chaotic maps, or alternatively two or more of these cascaded chaotic maps may be the same cascaded chaotic map. Additionally, the key(s) for each of the cascaded chaotic maps may be different, or alternatively two or more of these keys may be the same key. In certain embodiments, each cascaded chaotic map has a set of multiple keys, that it rotates through, using the next key in the set of multiple keys each time the cascaded chaotic map needs a key.

Figure 6:
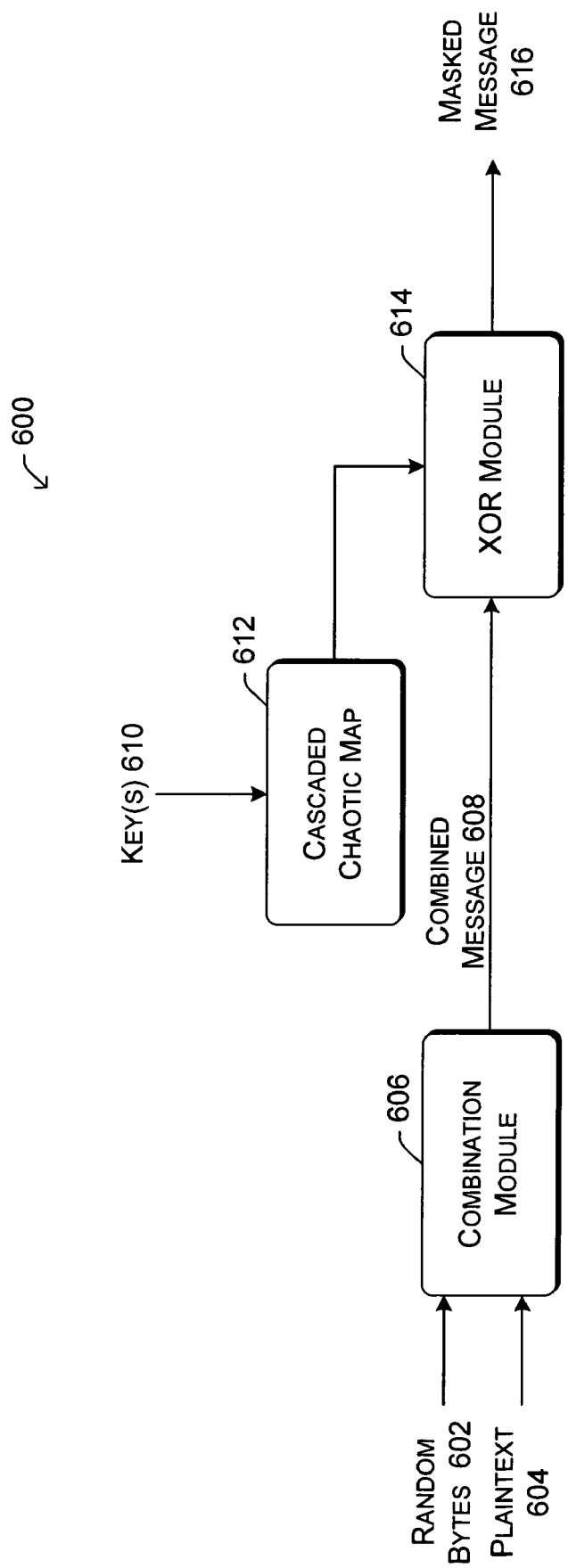
FIG. 6 is a block diagram illustrating an example system that masks plaintext.

FIG. 6 is a block diagram illustrating an example system 600 that masks plaintext. System 600 can be, for example, source masking stage 202 of FIG. 2. System 600 may also generate, for example, the masked message as discussed in act 304 of FIG. 3.

In system 600, random bytes 602 and plaintext 604 are input to a combination module 606. Plaintext 604 is a block of information to be encrypted. Plaintext 604 may be all of an item of information to be encrypted (e.g., an entire file, an entire message, and so forth), or alternatively a block or portion of an item of information to be encrypted. Random bytes 602 are one or more bytes to be combined with plaintext 604. In one implementation random bytes 602 is made up of ten randomly (or pseudo-randomly) generated bytes. However, it is to be appreciated that any number of bytes can be included in random bytes 602. Alternatively, rather than being randomly generated, bytes 602 may be generated in accordance with another non-random algorithm(s) or process(es).

Combination module 606 combines random bytes 602 and plaintext 604 to generate combined message 608. This combination may be performed in different manners. In certain embodiments, random bytes 602 are inserted at the beginning of plaintext 604. Alternatively, random bytes 602 may be inserted at different locations of plaintext 604 (e.g., at the end, some bytes at the beginning and some bytes at the end, at least some bytes interspersed among the bytes of plaintext 604, and so forth).

Also in system 600, one or more keys 610 are input to a cascaded chaotic map 612. The cascaded chaotic map is a K-cascaded chaotic map as discussed above. Key(s) 610 are the values $p_0, x_1(0), \ldots, x_{K-1}(0)$ that are the initial conditions and parameters of the K-cascaded chaotic map. Given key(s) 610, cascaded chaotic map 612 generates a real number that is quantized to 256 values. Thus, cascaded chaotic map 612 outputs one of 256 different values, which can be represented by a single byte. Cascaded chaotic map 612 can be run multiple times, with each run resulting in a single byte. These single bytes generated by successive iterations are exclusive-or'd by exclusive-or (XOR) module 614 with successive bytes (from the first byte to the last byte) of combined message 608. The bytes resulting from this exclusive-or'ing are output by XOR module 614 as masked message 616. Alternatively, XOR module 614 may XOR a single byte from cascaded chaotic map 612 with multiple bytes of combined message 608 rather than using a separate byte from cascaded chaotic map 612 for each byte of combined message 608.

Figure 7:
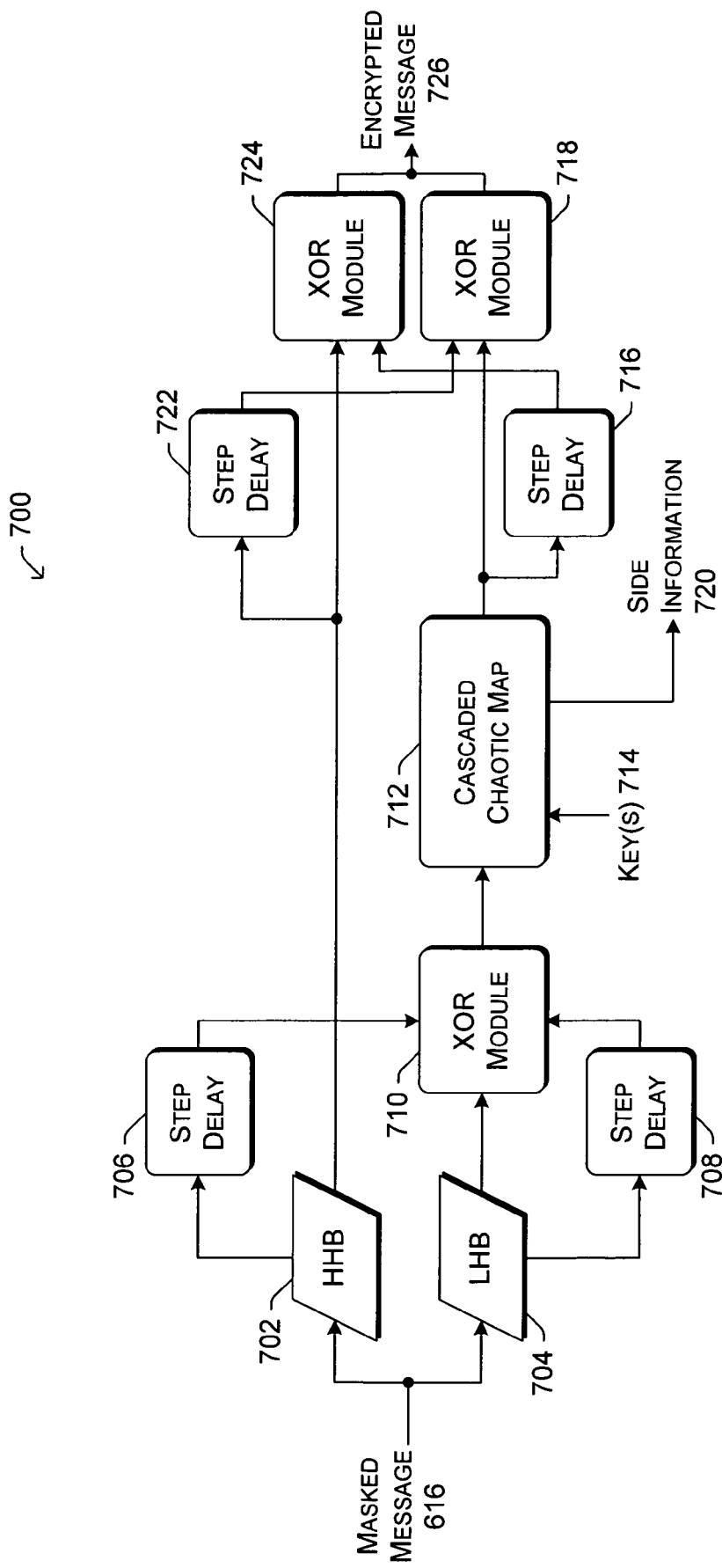
FIG. 7 is a block diagram illustrating an example system that encrypts a message.

FIG. 7 is a block diagram illustrating an example system 700 that encrypts a message. System 700 can be, for example, encryption stage 204 of FIG. 2. System 700 may also generate, for example, the encrypted message as discussed in act 306 of FIG. 3.

In system 700, masked message 616 is processed byte by byte, from the first byte of masked message 616 to the last byte of masked message 616. Each byte is separated into a high half-byte (HHB) 702 and a low half-byte (LHB) 704. Alternatively, rather than separating each byte into high and low halves, each byte may be separated in different manners, such as by selecting alternating bits (e.g., bits 0, 2, 4, and 6 as one half, and bits 1, 3, 5, and 7 as the other half) or by selecting bits in accordance with other techniques. Regardless of how the bits are selected, each byte is separated into two portions each having four bits.

HHB 702 is delayed one step by block 706, and LHB 704 is delayed one step by block 708. The one step delays in system 700 allow calculations to be performed based on both the current byte as well as the previous byte (which is kept by the step delay). XOR module 710 exclusive-or's LHB 704 with the LHB of the previous byte and the HHB of the previous byte, and outputs the result to cascaded chaotic map 712. XOR module 710 may also optionally add a fixed value to its result prior to outputting the result to cascaded chaotic map 712. In certain embodiments this fixed value is one or two, although this fixed value may be any amount. Adding the fixed value to the result ensures that this input to cascaded chaotic map 712 is not zero.

The output from XOR module 710 identifies the number of iterations of cascaded chaotic map 712 that will be performed for this byte. Cascaded chaotic map 712 also receives key(s) 714 as input. Key(s) 714 are the values $p_0, x_1(0), \ldots, x_{K-1}(0)$ that are the initial conditions and parameters of the K-cascaded chaotic map. Given key(s) 714, cascaded chaotic map 712 generates a real number that is quantized to 16 values. Thus, cascaded chaotic map 712 outputs one of 16 different values, which can be represented by one half-byte. All four bits of this half-byte are input to step delay 716 and XOR module 718. The cascaded chaotic map 712 also outputs one-byte, or alternatively half-byte, side information 720 representing how many times the specific output value (one of 16 values) is encountered during the given number of its iterations. The side information 720 ensures one-to-one mapping between the number of iterations and the 16 output values, which is used for decryption of the encrypted message 726 to masked message 616.

The output of cascaded chaotic map 712 is delayed one step by block 716. HHB 702 is delayed one step by step delay 722. The output of cascaded chaotic map 712 and HHB of the previous byte (from step delay 722) are XOR'd by XOR module 718. HHB 702 and the output of cascaded chaotic map 712 from the previous byte (from step delay 716) are XOR'd by XOR module 724. XOR module 724 generates the high four bits of the encrypted byte, while XOR module 718 generates the low four bits of the encrypted byte. The encrypted bytes are output by modules 724 and 718 as encrypted message 726.

Figure 8:
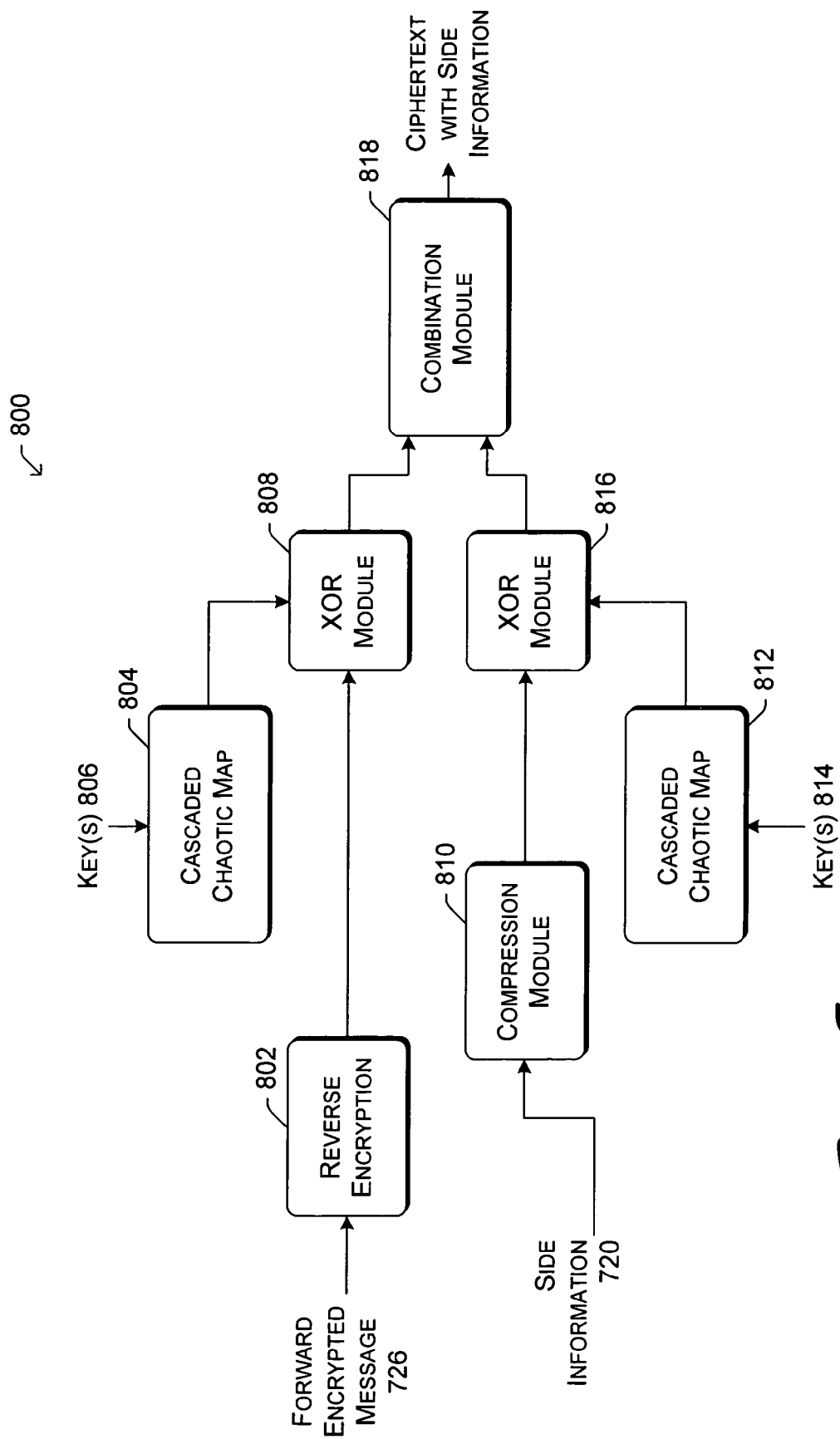
FIG. 8 is a block diagram illustrating an example system that reverse encrypts and masks a message.

FIG. 8 is a block diagram illustrating an example system 800 that reverse encrypts and masks a message. System 800 can be, for example, reverse encryption stage 206 of FIG. 2. System 800 may also generate, for example, the reverse encrypted message and ciphertext as discussed in acts 308 and 310 of FIG. 3.

In system 800, forward encrypted message 726 is reverse encrypted (block 802). This reverse encryption is performed by system 700 as discussed above with respect to FIG. 7, except that forward encrypted message 726 is processed byte by byte in reverse order. In other words, forward encrypted message 726 is processed byte by byte from the last byte of forward encrypted message 726 to the first byte of forward encrypted message 726.

Also in system 800, cascaded chaotic map 804 receives key(s) 806 as input. Key(s) 806 are the values $p_0, x_1(0), \ldots, x_{K-1}(0)$ that are the initial conditions and parameters of the K-cascaded chaotic map. Given key(s) 806, cascaded chaotic map 804 generates a real number that is quantized to 256 values. Thus, cascaded chaotic map 804 outputs one of 256 different values, which can be represented by one byte.

XOR module 808 receives the output of cascaded chaotic map 804 and also the reverse encrypted message output from reverse encryption block 802. XOR module 808 XORs the bytes of the reverse encrypted message with the bytes from cascaded chaotic map 804. Cascaded chaotic map 804 can be run multiple times, with each run resulting in a single byte. These single bytes generated by successive iterations are XOR'd with successive bytes (from the first byte to the last byte) of the reverse encrypted message by XOR module 808. Alternatively, XOR module 808 may XOR a single byte from cascaded chaotic map 804 with multiple bytes of the reverse encrypted message rather than using a separate byte from cascaded chaotic map 804 for each byte of the reverse encrypted message.

Also in system 800, side information 720 is input to a compression module 810. This side information is the side information generated by system 700 of FIG. 7 for both the forward encryption of the masked message, and the reverse encryption of the forward encrypted message. Compression module 810 can use any of a variety of lossless compression processes to compress side information 720. In certain embodiments, the zlib compression process is used, although other compression processes could alternatively be used. Additional information on the zlib compression process can be found on the internet at the URL "www." followed by "zlib.net".

Cascaded chaotic map 812 receives key(s) 814 as input. Key(s) 814 are the values $p_0, x_1(0), \ldots, x_{K-1}(0)$ that are the initial conditions and parameters of the K-cascaded chaotic map. Given key(s) 814, cascaded chaotic map 812 generates a real number that is quantized to 256 values. Thus, cascaded chaotic map 812 outputs one of 256 different values, which can be represented by one byte.

XOR module 816 receives the output of cascaded chaotic map 812 and also the compressed side information output from compression module 810. XOR module 816 XORs the bytes of the compressed side information with the bytes from cascaded chaotic map 812. Multiple iterations of cascaded chaotic map 812 can be run, with each iteration resulting in a single byte. These single bytes generated by successive iterations are XOR'd with successive bytes (from the first byte to the last byte) of the compressed side information by XOR module 816. Alternatively, XOR module 816 may XOR a single byte from cascaded chaotic map 812 with multiple bytes of the compressed side information rather than using a separate byte from cascaded chaotic map 812 for each byte of the compressed side information.

The output of XOR module 808 and XOR module 816 are then combined by combination module 818. This combination can be performed in any of a variety of manners. By way of example, the outputs of modules 808 and 816 may be concatenated together, the outputs of modules 808 and 816 may be interspersed (e.g., alternatively using bytes from the output of module 808 and from the output of module 816), and so forth.

Figure 9:
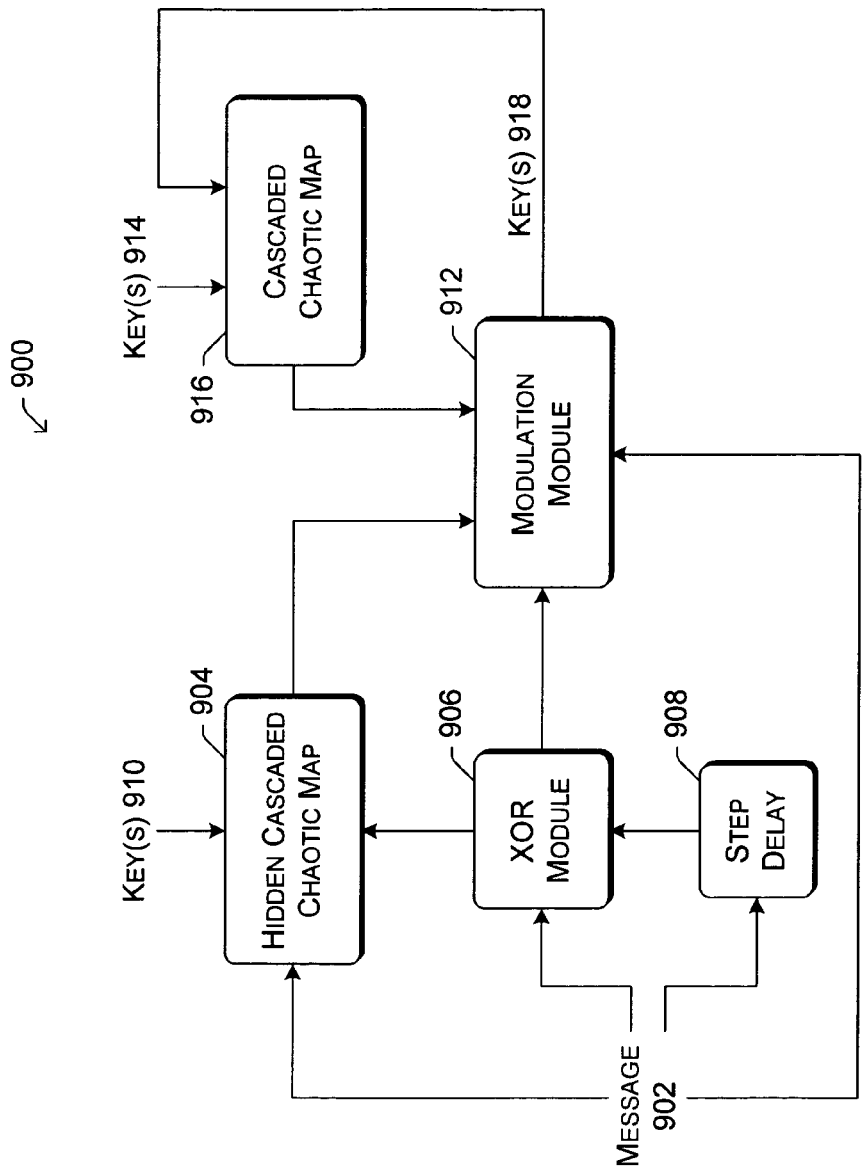
FIG. 9 is a block diagram illustrating an example system that uses a hidden cascaded chaotic map to generate keys.

FIG. 9 is a block diagram illustrating an example system 900 that uses a hidden cascaded chaotic map to generate keys. System 900 can be used to generate keys for any of the cascaded chaotic maps discussed herein, such as keys 714 of system 700 of FIG. 7. System 900 can also be used to generate the keys for any other of the cascaded chaotic maps discussed herein. In system 900, the keys generated for input to a cascaded chaotic map are hidden, and dependent on the input message itself.

In system 900, message 902 is processed byte by byte. Bytes of message 902 are input to a hidden cascaded chaotic map 904, an XOR module 906, a step delay 908, and a modulation module 912. Message 902 can be, for example, masked message 616 (when forward encryption is being performed) or forward encrypted message 726 (when reverse encryption is being performed).

Each byte of message 902 is delayed one step by step delay 908. The one step delay 908 allows calculations to be performed based on both the current byte as well as the previous byte (which is kept by the step delay). XOR module 906 XOR's a byte of message 902 with the previous byte of message 902, and outputs the result to hidden cascaded chaotic map 904 and modulation module 912.

Hidden cascaded chaotic map 904 also receives key(s) 910 as input. Key(s) 910 are the values $p_0, x_1(0), \ldots, x_{K-1}(0)$ that are the initial conditions and parameters of the K-cascaded chaotic map. Given key(s) 910, cascaded chaotic map 904 generates a set of values $x_1(n), \ldots, x_{K-1}(n)$.

The current byte of message 902 identifies the number of iterations, n, of hidden cascaded chaotic map 904 that will be performed for these input values. A fixed value may optionally be added to this number of iterations, n, to ensure that this input to hidden cascaded chaotic map 904 is not zero.

The output from XOR module 906 can be used by hidden cascaded chaotic map 904 in different manners. For example, the output from XOR module 906 could be used in place of the byte from message 902 to determine the number of iterations of hidden cascaded chaotic map 904 that will be performed, or may be combined (e.g., XOR'd, added, subtracted, etc.) with the byte from message 902 to determine the number of iterations of hidden cascaded chaotic map 904 that will be performed. By way of another example, the output from XOR module 906 could be used as a key(s) 910 of hidden cascaded chaotic map 904.

The output values $x_1(n), \ldots, x_{K-1}(0)$ of hidden cascaded chaotic map 904 are combined with the current values $x_1(0), \ldots, x_{K-1}(0)$ of a subsequent cascaded chaotic map 916 as a function of the output from XOR module 906 as well as the current byte of message 902 by the modulation module 912. The cascaded chaotic map 916 may correspond to any of the cascaded chaotic maps discussed herein, such as cascaded chaotic map 712 of system 700 of FIG. 7. The cascaded chaotic map 916 initially accepts the given key(s) 914 as its input keys and generates the current values $x_1(0), \ldots, x_{K-1}(0)$. In subsequent iterations (and/or for subsequent bytes), the cascaded chaotic map 916 accepts the key(s) 918 that are generated by the modulation module 912. Modulation module 912 combines, for example, the output values $x_1(0), \ldots, x_{K-1}(0)$ of 904 and the output values $x_1(n), \ldots, x_{K-1}(n)$ of hidden cascaded chaotic map 904. This combination process as well as the number of iterations performed by hidden cascaded chaotic map 916 can be determined in different manners. For example, the number of iterations can be a fixed number, can be a function of the key(s) 914 and/or 918, can be a function of message 902, and so forth. This combination by module 912 can be performed after each iteration of maps 904 and 916.

This combination by modulation module 912 can be performed in any of a variety of manners. For example, selected portions of the output values from hidden cascaded chaotic map 904 can be XOR'd with selected portions of the output values from hidden cascaded chaotic map 916, with the different portions being selected based on the output of XOR module 906, the current byte of message 902, another algorithm, combinations thereof, and so forth.

One example of the way in which this combination can be performed by modulation module 912 is illustrated using the following C++ code. A loop can be run with a counter i that runs from 0 to 7, where counter i corresponds to a specific bit of the output byte of XOR module 906 or the current byte of message 902, or combinations thereof, and so forth. Two integer values, ind1 and ind2, can be calculated as follows:

$$ind1 = (int)i/2;$$

$$ind2 = i\%2;$$

Using the integer values ind1 and ind2, the bytes of the keys from map 916 can be XOR'd with the bytes of the keys from map 904 using the following calculations, where inputKey.key[ ].byteval[ ] refers to a byte of a key output from map 916, and arrayKeys[ ].key[ ].byteval[ ] refers to a byte of a key output from map 904:

inputKey.key[ind1].byteval[ind2+4]=inputKey.
 key[ind1].byteval[ind2+4]^arrayKeys[0].
 key[ind1].byteval[(2*ind2)+3]; and
inputKey.key[ind1].byteval[ind2+3]=inputKey.
 key[ind1].byteval[ind2+4]^arrayKeys[0].
 key[ind1].byteval[ind2];

After the loop has been completed eight times, the output from map 916 has been combined with the output from map 904 for the current iterations of maps 904 and 916.

The output of modulation module 912 is at least some of the key(s) 914 and/or 918 that can be used as the key(s) for a cascaded chaotic map. Modulation module 912 may generate a sufficient number of bytes to use for all of the key(s) for a cascaded chaotic map (e.g., all of the initial condition and parameter values $p_0, x_1(0), \ldots, x_{K-1}(0)$). In such situations, the key(s) 914 and/or 918 are created during the encryption and decryption process, and thus do not need to be provided to the encryption and decryption modules separately. Alternatively, modulation module 912 may output only enough bytes to use for some of the key(s) for the cascaded chaotic map, in which case the remainder of the key(s) are obtained elsewhere (e.g., supplied to the encryption and decryption modules as at least part of the symmetric key for encryption and decryption).

Although only a single hidden cascaded chaotic map is illustrated in FIG. 9, alternatively multiple hidden cascaded chaotic maps may be used. For example, key(s) 910 can be generated by an additional hidden cascaded chaotic map in a manner analogous to the generation of key(s) 914 and/or 918 illustrated in FIG. 9. The key(s) to this additional hidden cascaded chaotic map can also be generated by using yet another hidden cascaded chaotic map in a manner analogous to the generation of key(s) 914 and/or 918 illustrated in FIG. 9. Further additional hidden cascaded chaotic maps can also be employed to generate key(s) for each previously added hidden cascaded chaotic map. Alternatively, multiple hidden cascaded chaotic maps similar to 904 with their own respective keys similar to 910 may be implemented in parallel such that their output values $x_1(0), \ldots, x_{K-1}(0)$ are combined by the modulation module 912 as a function of the output of XOR module 906, message 902, and/or key(s) 914 to obtain the key(s) 914 and/or 918.

Figure 10:
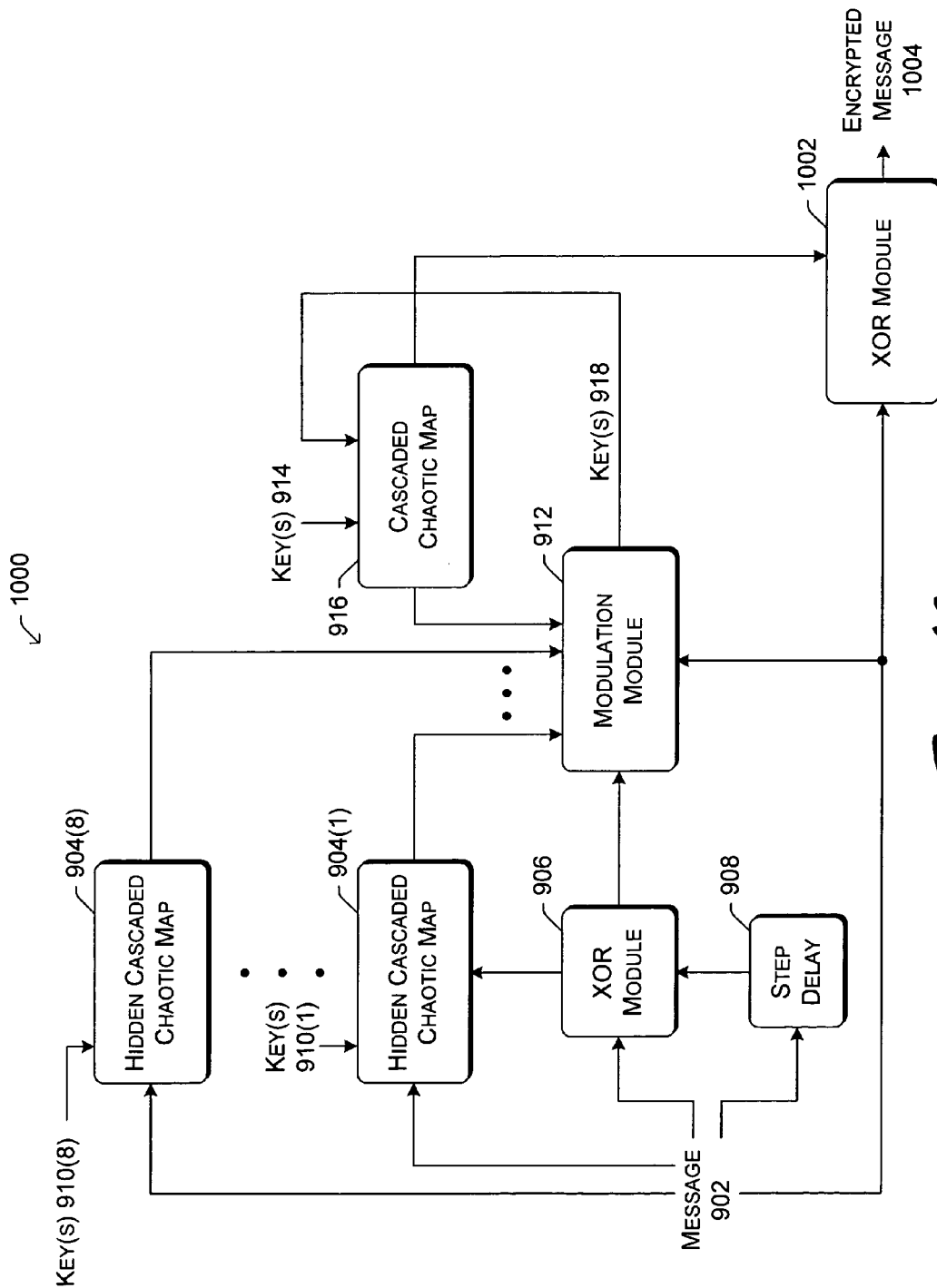
FIG. 10 is a block diagram illustrating another example system that uses multiple hidden cascaded chaotic maps.

FIG. 10 is a block diagram illustrating another example system 1000 that can replace the example system 700 in FIG. 7 in some implementations. The components of system 1000 operate analogously to those of system 900 of FIG. 9, except as discussed below. System 1000 may be, for example, encryption stage 204 of FIG. 2 or it may also generate, for example, the encrypted message as discussed in act 306 of FIG. 3. In system 1000, message 902 is processed byte by byte, from the first byte of message 902 to the last byte of message 902 (or, if reverse encryption is being performed, from the last byte of message 902 to the first byte of message 902). Message 902 can be, for example, masked message 616 (when forward encryption is being performed) or forward encrypted message 726 (when reverse encryption is being performed).

In system 1000, eight parallel hidden cascaded chaotic maps 904(1)-904(8) with their respective individual keys 910(1)-910(8) are implemented such that their output values $x_1^i(0), \ldots, x_{K-1}^i(0)$ (i=1, 2, ... 8) are combined by the modulation module 912 as a function of the output of XOR module 906, message 902, and/or current key(s) 914 or 918 to obtain the future key(s) 918. Subsequently, the message 902 and part of the output of cascaded chaotic map 916 which is obtained for example after a fixed number of iterations of the cascaded chaotic map 916 using the key(s) 918, are XOR'd by XOR module 1002 to obtain the encrypted message 1004.

Figure 11:
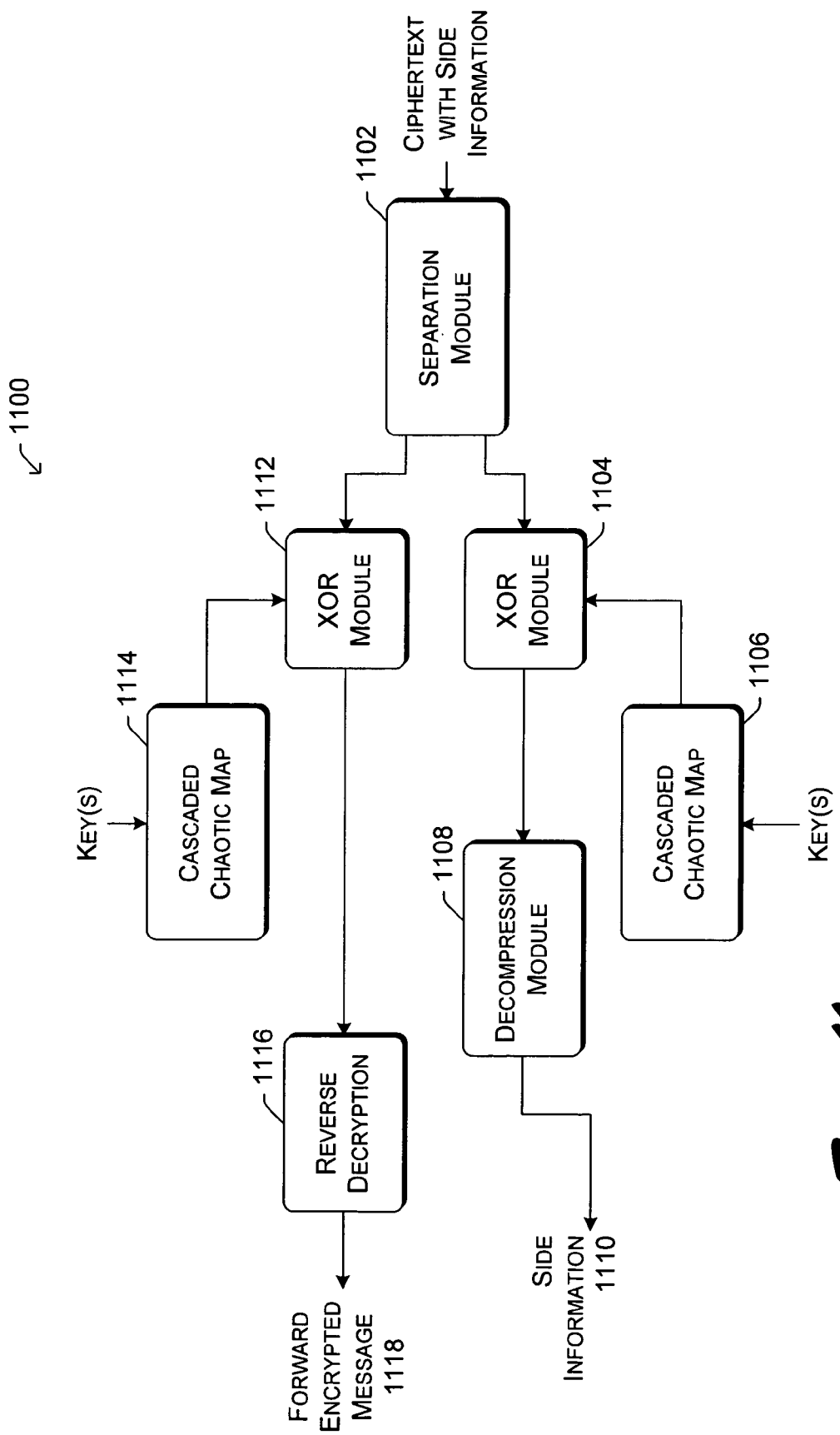
FIG. 11 is a block diagram illustrating an example system that unmasks and reverse decrypts a message.
Figure 12:
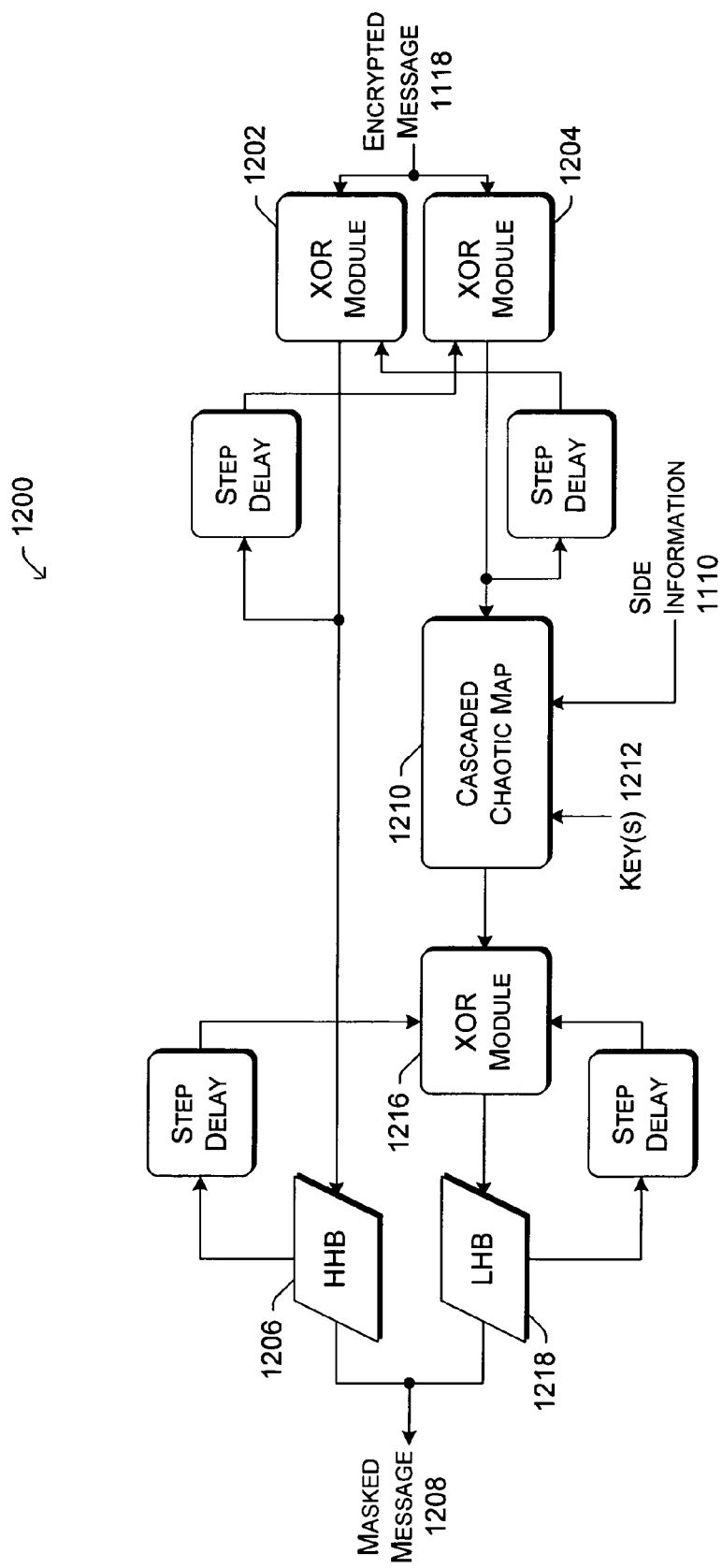
FIG. 12 is a block diagram illustrating an example system that decrypts a message.
Figure 13:
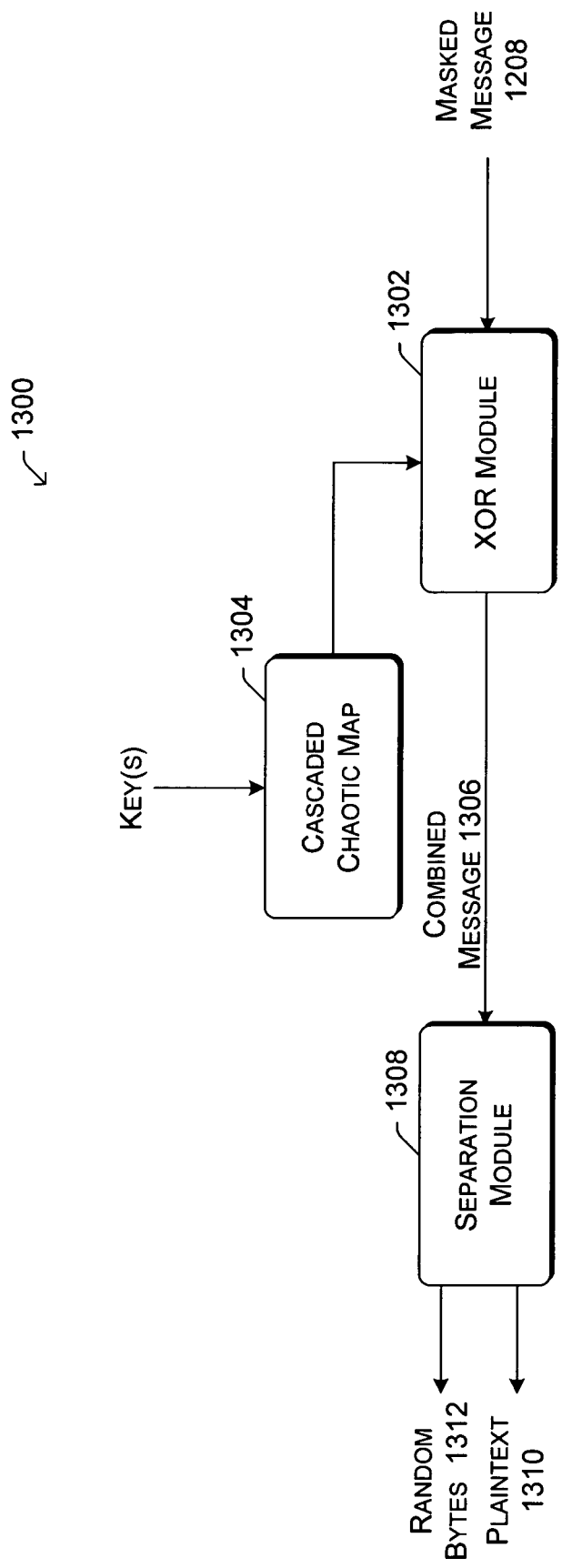
FIG. 13 is a block diagram illustrating an example system that unmasks a masked message.

FIGS. 11-13 illustrate an example implementation of the decryption techniques and methods discussed above. The implementations of FIGS. 11-13 can be performed by software, firmware, hardware, or combinations thereof. Multiple cascaded chaotic maps are discussed in FIGS. 11-13. Each of these cascaded chaotic maps in FIGS. 11-13 may be different cascaded chaotic maps, or alternatively two or more of these cascaded chaotic maps may be the same cascaded chaotic map. Additionally, the key(s) for each of the cascaded chaotic maps may be different, or alternatively two or more of these keys may be the same key. As in the encryption case, in certain embodiments, each cascaded chaotic map has a set of multiple keys that it rotates through, using the next key in the set of multiple keys each time the cascaded chaotic map needs a key.

The decryption illustrated in FIGS. 11-13 is the reverse process of the encryption shown in FIGS. 6-8. As such, the operation of many of the components in FIGS. 11-13 is the same as the corresponding components in FIGS. 6-8. Although the cascaded chaotic maps and the key(s) to the cascaded chaotic maps may vary, as the encryption and decryption are symmetric, these cascaded chaotic maps and key(s) are the same cascaded chaotic maps and key(s) used in the encryption discussed with reference to FIGS. 6-8.

FIG. 11 is a block diagram illustrating an example system 1100 that unmasks and reverse decrypts a message. System 1100 can be, for example, reverse decryption stage 402 of FIG. 4. System 1100 may also, for example, unmask the ciphertext and generate the encrypted message as discussed in acts 504 and 506 of FIG. 5.

Separation module 1102 receives the ciphertext with side information and separates the side information from the remainder of the ciphertext. The side information is input to XOR module 1104, where it is XOR'd with the output of cascaded chaotic map 1106. The output of XOR module 1104 is input to decompression module 1108, which decompresses the output of XOR module 1104. Various decompression processes can be used by decompression module 1108, with the particular decompression process used being the appropriate process to decompress data compressed by compression module 810 of FIG. 8.

The remainder of the ciphertext (the non-side information part) is input to XOR module 1112, where it is XOR'd with the output of cascaded chaotic map 1114. The output of XOR module 1112 is input to reverse decryption block 1116, where the output is reverse decrypted. This reverse decryption is performed by system 1200 discussed below with respect to FIG. 12, except that the output of XOR module 1112 is processed byte by byte in reverse order. In other words, the output of XOR module 1112 is processed byte by byte from its last byte to its first byte. The reverse decryption 1116 outputs a forward encrypted message 1118.

FIG. 12 is a block diagram illustrating an example system 1200 that decrypts a message. System 1200 can be, for example, decryption stage 404 of FIG. 4. System 1200 may also, for example, decrypt the encrypted message as discussed in act 508 of FIG. 5.

Encrypted message 1118 (output from reverse decryption block 1116 of FIG. 11) is input to XOR module 1202 and XOR module 1204. Each high half-byte of encrypted message 1118 is input to XOR module 1202, and each low half-byte of encrypted message 1118 is input to XOR module 1204. XOR module 1204 XOR's the low half-byte of encrypted message 1118 with the previous output of XOR module 1202. XOR module 1202 XOR's the high half-byte of encrypted message 1118 with the previous output of XOR module 1204. The output of XOR module 1202 is the high half-byte 1206 of the masked message 1208 output by system 1200.

The output of XOR module 1204 is input to cascaded chaotic map 1210, along with key(s) 1212 and side information 1110. The output of XOR module 1204 indicates the half-byte originally obtained as a result of the (specific number of) iterations of the cascaded chaotic map 712 in the encryption stage. Combined with the side information 1110, the cascaded chaotic map 1210 outputs the number of iterations which was the input to cascaded chaotic map 712. Note that, this is the exact reverse of the operation carried out by the cascaded chaotic map 712 depicted in FIG. 7.

The output of cascaded chaotic map 1210 is input to XOR module 1216, where it is XOR'd with the previous high half-byte and the previous output of XOR module 1216. The output of XOR module 1216 is the low half-byte 1218 of masked message 1208 output by system 1200.

FIG. 13 is a block diagram illustrating an example system 1300 that unmasks a masked message. System 1300 can be, for example, source unmasking stage 406 of FIG. 4. System 1300 may also generate, for example, the plaintext as discussed in act 510 of FIG. 5.

Masked message 1208 (output from system 1200 of FIG. 12) is input to XOR module 1302. XOR module 1302 XOR's masked message 1208 with the output of cascaded chaotic map 1304 to generate a combined message 1306. The combined message is input to separation module 1308, where it is separated into plaintext 1310 and random bytes 1312. Plaintext 1310 and random bytes 1312 are output by separation module 1308, although alternatively random bytes 1312 may not be output by separation module 1308.

It should also be noted that, in situations where one or more hidden cascaded chaotic maps as discussed above with respect to FIG. 9 are used in the encryption process, the same one or more hidden cascaded chaotic maps are used in the decryption process. For example, if a hidden cascaded chaotic map is used to generate the key(s) for cascaded chaotic map 712 of FIG. 7, then the same hidden cascaded chaotic map would be used to generate the key(s) for cascaded chaotic map 1210 of FIG. 12.

Figure 14:
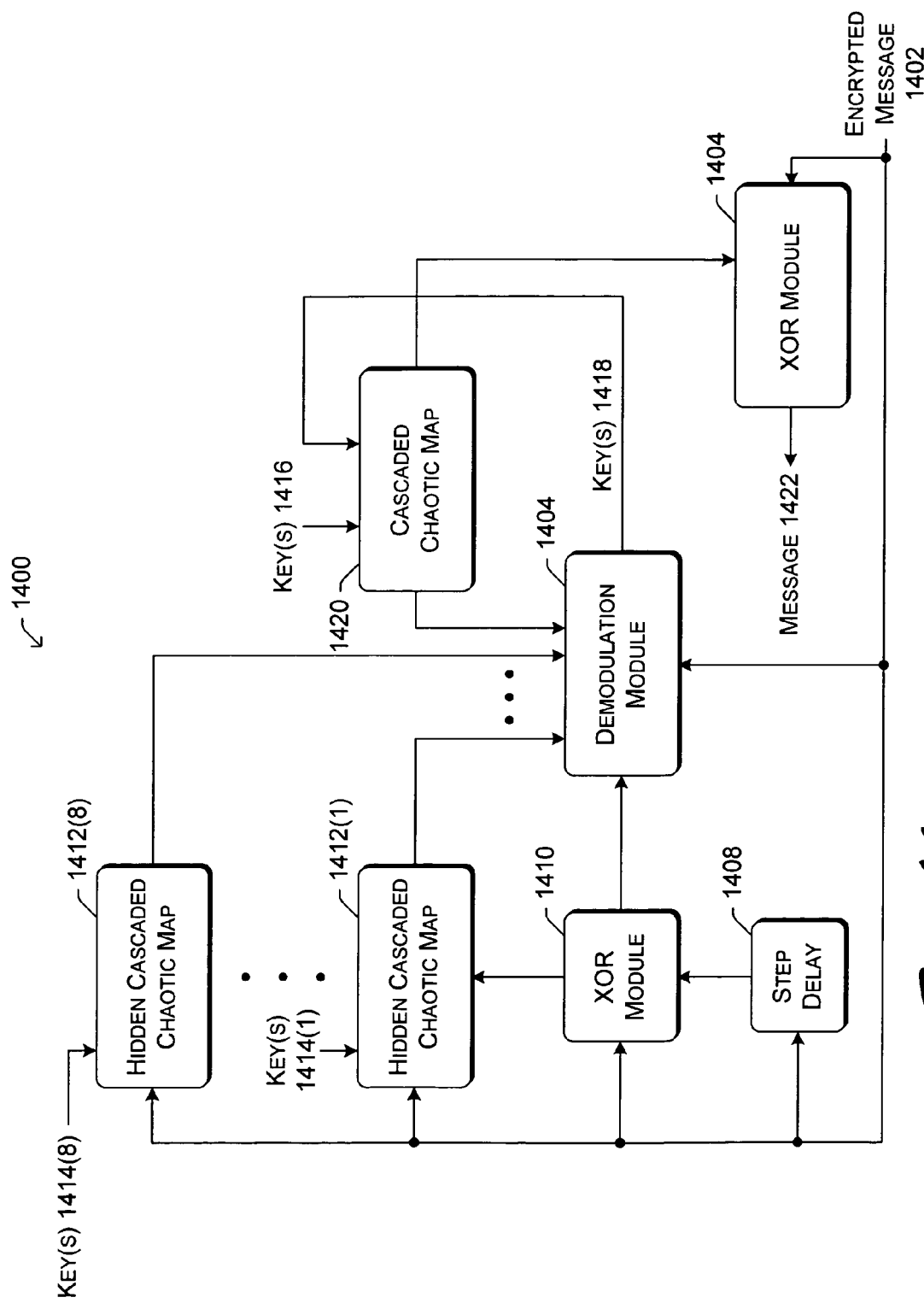
FIG. 14 is a block diagram illustrating an example system that uses multiple hidden cascaded chaotic maps to decrypt a message.

FIG. 14 is a block diagram illustrating an example system 1400 that can replace the example system 1200 in FIG. 12 in some implementations. The decryption illustrated in FIG. 14 is the reverse process of the encryption shown in FIG. 10. As such, the operation of many of the components in FIG. 14 is the same as the corresponding components in FIG. 10. Although the cascaded chaotic maps and the key(s) to the cascaded chaotic maps may vary, as the encryption and decryption are symmetric, these cascaded chaotic maps and key(s) are the same cascaded chaotic maps and key(s) used in the encryption discussed with reference to FIG. 10.

In system 1400, encrypted message 1402 is processed byte by byte, from the first byte of message 1402 to the last byte of message 1402 (or, if reverse encryption is being performed, from the last byte of message 1402 to the first byte of message 1402).

In system 1400, the encrypted message 1402 is input to an XOR module 1404, as well as a demodulation module 1406, a step delay 1408, an XOR module 1410, and hidden cascaded chaotic maps 1412(1)-1412(8). Eight parallel hidden cascaded chaotic maps 1412(1)-1412(8) with their respective individual keys 1414(1)-1414(8) are implemented such that their output values $x_1^i(0), \ldots, x_{K-1}^i(0)$ ($i=1, 2, \ldots 8$) are combined by the demodulation module 1404 as a function of the output of XOR module 1410, message 1402, and/or current key(s) 1416 or 1418 input to cascaded chaotic map 1420 to obtain the future key(s) 1418. Subsequently, the encrypted message 1402 and part of the output of cascaded chaotic map 1416 which is obtained for example after a fixed number of iterations of the cascaded chaotic map 1416 using the key(s) 1418, are XOR'd by XOR module 1404 to obtain the decrypted message 1422.

Figure 15:
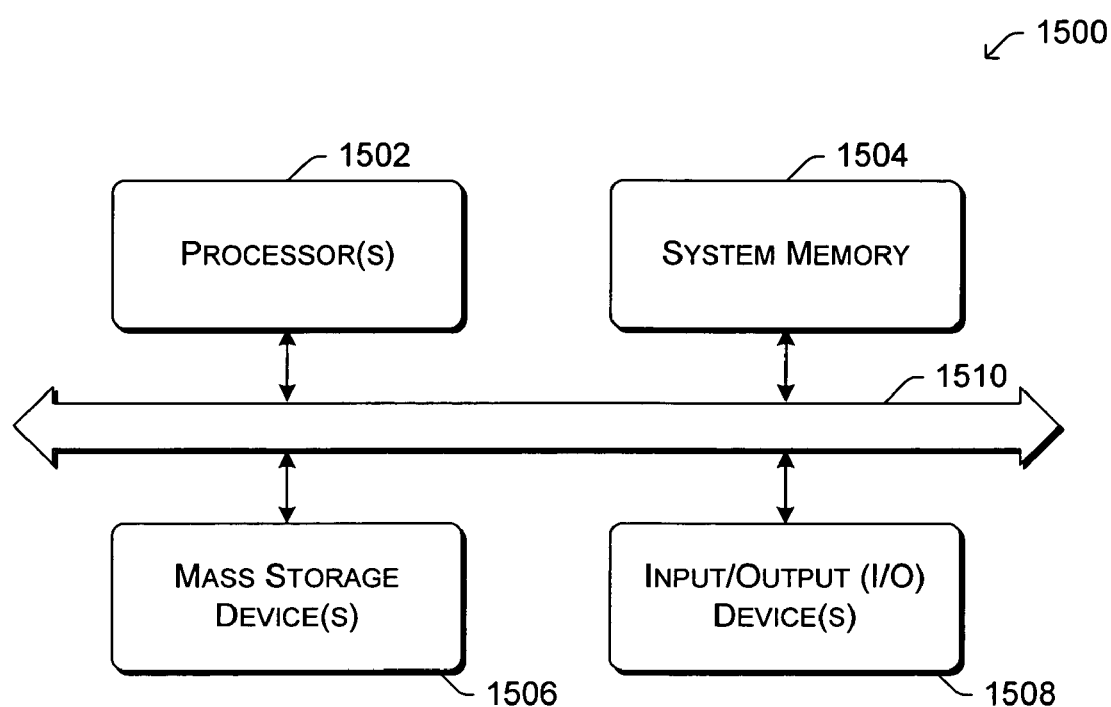
FIG. 15 is a block diagram illustrating an example computing device.

FIG. 15 is a block diagram illustrating an example computing device 1500. Computing device 1500 may be used to implement the various techniques and processes discussed herein. For example, computing device 1500 may implement chaotic encryption module 106 of FIG. 1, chaotic decryption module 110 of FIG. 1, encryption technique 200 of FIG. 2, decryption technique 400 of FIG. 4, and so forth. Computing device 1500 can be any of a wide variety of computing devices, such as a desktop computer, a server computer, a handheld computer, a notebook computer, a personal digital assistant (PDA), an internet appliance, a game console, a set-top box, a cellular phone, a digital camera, audio and/or video players, audio and/or video recorders, and so forth.

Computing device 1500 includes one or more processor(s) 1502, system memory 1504, mass storage device(s) 1506, input/output (I/O) device(s) 1508, and bus 1510. Processor(s) 1502 include one or more processors or controllers that execute instructions stored in system memory 1504 and/or mass storage device(s) 1506. Processor(s) 1502 may also include computer readable media, such as cache memory.

System memory 1504 includes various computer readable media, including volatile memory (such as random access memory (RAM)) and/or nonvolatile memory (such as read only memory (ROM)). System memory 1504 may include rewritable ROM, such as Flash memory.

Mass storage device(s) 1506 include various computer readable media, such as magnetic disks, optical disks, solid state memory (e.g., flash memory), and so forth. Various drives may also be included in mass storage device(s) 1506 to enable reading from and/or writing to the various computer readable media. Mass storage device(s) 1506 include removable media and/or nonremovable media.

I/O device(s) 1508 include various devices that allow data and/or other information to be input to and/or output from computing device 1500. Examples of I/O device(s) 1508 include cursor control devices, keypads, microphones, monitors or other displays, speakers, printers, network interface cards, modems, lenses, CCDs or other image capture devices, and so forth.

Bus 1510 allows processor(s) 1502, system 1504, mass storage device(s) 1506, and I/O device(s) 1508 to communicate with one another. Bus 1510 can be one or more of multiple types of buses, such as a system bus, PCI bus, IEEE 1394 bus, USB bus, and so forth.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable non-transitory media having stored thereon a plurality of instructions that, when executed by one or more processors of a computer, cause the one or more processors to:
   receive plaintext to be encrypted; and
   encrypt the plaintext using an output value of each of one or more cascaded chaotic maps, wherein each of the one or more cascaded chaotic maps includes multiple chaotic maps each at one of multiple levels, wherein two or more of the multiple chaotic maps in one of the one or more cascaded chaotic maps are different chaotic maps, and wherein for each of the one or more cascaded chaotic maps a first of the multiple chaotic maps at a first of the multiple levels generates an output based at least in part on a key, one or more additional chaotic maps at one or more additional levels of the multiple levels each generates an output based at least in part on an output generated by a chaotic map at a previous level of the multiple levels and at least part of the key, and one of the one or more additional chaotic maps generates the output value.

2. One or more computer readable non-transitory media as recited in claim 1, wherein to encrypt the plaintext is to:
   generate a forward encrypted message by forward encrypting the plaintext based at least in part on an output value of a first cascaded chaotic map, the forward encrypting beginning with a first byte of the plaintext and working towards a last byte of the plaintext; and
   reverse encrypt the forward encrypted message based at least in part on an output value of a second cascaded chaotic map by beginning with a last byte of the forward encrypted message and working towards a first byte of the forward encrypted message.

3. One or more computer readable non-transitory media as recited in claim 2, wherein the first cascaded chaotic map and the second cascaded chaotic map are the same cascaded chaotic map.

4. One or more computer readable non-transitory media as recited in claim 1, wherein the instructions further cause the one or more processors to, prior to the encryption:
   combine the plaintext with a plurality of random bytes to generate a combined message; and
   mask the combined message using a cascaded chaotic map.

5. One or more computer readable non-transitory media as recited in claim 1, wherein the instructions further cause the one or more processors to:

use, as at least part of the key for at least one of the one or more cascaded chaotic maps, an output of an additional cascaded chaotic map.

6. One or more computer readable non-transitory media as recited in claim 1, wherein the plurality of instructions further cause the one or more processors to:
generate, based at least in part on the plaintext and one or more additional cascaded chaotic maps, the key of one of the one or more cascaded chaotic maps.

7. One or more computer readable non-transitory media as recited in claim 1, wherein the instructions further cause the one or more processors to encrypt the plaintext using a plurality of stages, the plurality of stages including:
a first stage in which the plaintext is combined with a plurality of random bytes to generate a combined message, and in which the combined message is masked based on an output value of a first cascaded chaotic map;
a second stage in which the output of the first stage is forward encrypted based at least in part on an output value of a second cascaded chaotic map by beginning with a first byte of the output of the first stage and working towards a last byte of the output of the first stage; and
a third stage in which the output of the second stage is reverse encrypted based at least in part on an output value of a third cascaded chaotic map by beginning with a last byte of the output of the second stage and working towards a first byte of the output of the second stage, and in which the output of the reverse encryption is masked based at least in part on an output value of a fourth cascaded chaotic map.

8. One or more computer readable non-transitory media as recited in claim 7, wherein the first cascaded chaotic map, the second cascaded chaotic map, the third cascaded chaotic map, and the fourth cascaded chaotic map are the same cascaded chaotic map.

9. One or more computer readable non-transitory media as recited in claim 1, wherein a value p represents a control parameter, wherein 0<p<1, wherein a value n represents a number of iterations of one of the one or more cascaded chaotic maps, wherein a function $F_{PWL}(\ )$ is defined as:

$$F_{PWL}(x(n), p) = \begin{cases} \frac{x(n)}{p}, & \text{if } x \in [0, p] \\ \frac{1-x(n)}{1-p}, & \text{if } x \in [p, 1] \end{cases}$$

wherein a set of values $p_0, x_1(0), \ldots, x_{K-1}(0)$ are the key of the one of the one or more cascaded chaotic maps, wherein each of a set of functions $F_1(\ ) F_2(\ ) \ldots, F_{K-1}(\ )$ represents a chaotic map, and wherein the one of the one or more cascaded chaotic maps is defined as:

$x_1(n+1)=F_1(x_1(n),p_0)$ $x_2(n+1)=F_2(x_2(n),x_1(n+1))$

.
.
.

$x_{K-1}(n+1)=F_{K-1}(x_{K-1}(n),x_{K-2}(n+1))$ $x(n+1)=F_{PWL}(x(n),x_{K-1}(n+1))$.

10. A method in a computing device, the method comprising:
receiving plaintext to be encrypted; and
encrypting by the computing device the plaintext using an output value of each of one or more cascaded chaotic maps, wherein each of the one or more cascaded chaotic maps includes multiple chaotic maps each at one of multiple levels, wherein two or more of the multiple chaotic maps in one of the one or more cascaded chaotic maps are different chaotic maps, and wherein for each of the one or more cascaded chaotic maps a first of the multiple chaotic maps at a first of the multiple levels generates an output based at least in part on a key, one or more additional chaotic maps at one or more additional levels of the multiple levels each generates an output based at least in part on an output generated by a chaotic map at a previous level of the multiple levels and at least part of the key, and one of the one or more additional chaotic maps generates the output value.

11. A method as recited in claim 10, wherein encrypting the plaintext comprises:
generating a forward encrypted message by forward encrypting the plaintext based at least in part on an output value of a first cascaded chaotic map, the forward encrypting beginning with a first byte of the plaintext and working towards a last byte of the plaintext; and
reverse encrypting the forward encrypted message based at least in part on an output value of a second cascaded chaotic map by beginning with a last byte of the forward encrypted message and working towards a first byte of the forward encrypted message.

12. A method as recited in claim 10, further comprising, prior to the encrypting:
combining the plaintext with a plurality of random bytes to generate a combined message; and
masking the combined message using a cascaded chaotic map.

13. A method as recited in claim 10, further comprising:
generating, based at least in part on the plaintext and one or more additional cascaded chaotic maps, the key of one of the one or more cascaded chaotic maps.

14. A method as recited in claim 10, wherein encrypting the plaintext comprises encrypting the plaintext using a plurality of stages, the plurality of stages including:
a first stage in which the plaintext is combined with a plurality of random bytes to generate a combined message, and in which the combined message is masked based on an output value of a first cascaded chaotic map;
a second stage in which the output of the first stage is forward encrypted based at least in part on an output value of a second cascaded chaotic map by beginning with a first byte of the output of the first stage and working towards a last byte of the output of the first stage; and
a third stage in which the output of the second stage is reverse encrypted based at least in part on an output value of a third cascaded chaotic map by beginning with a last byte of the output of the second stage and working towards a first byte of the output of the second stage, and in which the output of the reverse encryption is masked based at least in part on an output value of a fourth cascaded chaotic map.

15. A method in a computing device, the method comprising:
receiving ciphertext to be decrypted; and
decrypting by the computing device the ciphertext using an output value of each of one or more cascaded chaotic maps, wherein each of the one or more cascaded chaotic maps includes multiple chaotic maps each at one of multiple levels, wherein two or more of the multiple chaotic maps in one of the one or more cascaded chaotic maps are different chaotic maps, and wherein for each of the one or more cascaded chaotic maps a first of the multiple chaotic maps at a first of the multiple levels generates an output based at least in part on a key, one or more additional chaotic maps at one or more additional levels of the multiple levels each generates an output based at least in part on an output generated by a chaotic map at a previous level of the multiple levels and at least part of the key, and one of the one or more additional chaotic maps generates the output value.

16. A method as recited in claim 15, wherein decrypting the ciphertext comprises:
generating an encrypted message by reverse decrypting the ciphertext based at least in part on an output value of a first cascaded chaotic map, the reverse decrypting beginning with a last byte of the ciphertext and working towards a first byte of the ciphertext; and
forward decrypting the encrypted message based at least in part on an output value of a second cascaded chaotic map by beginning with a first byte of the encrypted message and working towards a last byte of the encrypted message.

17. A method as recited in claim 16, wherein the first cascaded chaotic map and the second cascaded chaotic map are the same cascaded chaotic map.

18. A method as recited in claim 15, further comprising, after the decrypting:
unmasking the decrypted message using a cascaded chaotic map to generate a combined message; and
removing a plurality of bytes from the combined message to generate a plaintext message.

19. A method as recited in claim 15, further comprising:
using, as at least part of the key for at least one of the one or more cascaded chaotic maps, an output of an additional cascaded chaotic map.

20. A method as recited in claim 15, wherein decrypting the ciphertext comprises decrypting the ciphertext using a plurality of stages, the plurality of stages including:
a first stage in which the ciphertext is unmasked based at least in part on an output value of a first cascaded chaotic map, and in which the unmasked ciphertext is reverse decrypted based at least in part on an output value of a second cascaded chaotic map by beginning with a last byte of the unmasked ciphertext and working towards a first byte of the unmasked ciphertext;
a second stage in which an output of the first stage is forward decrypted based at least in part on an output value of a third cascaded chaotic map by beginning with a first byte of the output of the first stage and working towards a last byte of the output of the first stage; and
a third stage in which an output of the second stage is unmasked based on an output value of a fourth cascaded chaotic map to generate a combined message, and in which the combined message is separated into a plurality of bytes and a plaintext.

21. A method as recited in claim 20, wherein the first cascaded chaotic map, the second cascaded chaotic map, the third cascaded chaotic map, and the fourth cascaded chaotic map are the same cascaded chaotic map.

22. One or more computer readable non-transitory media having stored thereon a plurality of instructions that, when executed by one or more processors of a computer, cause the one or more processors to:
receive ciphertext to be decrypted; and
decrypt the ciphertext using an output value of each of one or more cascaded chaotic maps, wherein each of the one or more cascaded chaotic maps includes multiple chaotic maps each at one of multiple levels, wherein two or more of the multiple chaotic maps in one of the one or more cascaded chaotic maps are different chaotic maps, and wherein for each of the one or more cascaded chaotic maps a first of the multiple chaotic maps at a first of the multiple levels generates an output based at least in part on a key, one or more additional chaotic maps at one or more additional levels of the multiple levels each generates an output based at least in part on an output generated by a chaotic map at a previous level of the multiple levels and at least part of the key, and one of the one or more additional chaotic maps generates the output value.

23. One or more computer readable non-transitory media as recited in claim 22, wherein to decrypt the ciphertext is to:
generate an encrypted message by reverse decrypting the ciphertext based at least in part on an output value of a first cascaded chaotic map, the reverse decrypting beginning with a last byte of the ciphertext and working towards a first byte of the ciphertext; and
forward decrypt the encrypted message based at least in part on an output value of a second cascaded chaotic map by beginning with a first byte of the encrypted message and working towards a last byte of the encrypted message.

24. One or more computer readable non-transitory media as recited in claim 22, wherein the instructions further cause the one or more processors to, after the decryption:
unmask the decrypted message using a cascaded chaotic map to generate a combined message; and
remove a plurality of bytes from the combined message to generate a plaintext message.

25. One or more computer readable non-transitory media as recited in claim 22, wherein to decrypt the ciphertext is to decrypt the ciphertext using a plurality of stages, the plurality of stages including:
a first stage in which the ciphertext is unmasked based at least in part on an output value of a first cascaded chaotic map, and in which the unmasked ciphertext is reverse decrypted based at least in part on an output value of a second cascaded chaotic map by beginning with a last byte of the unmasked ciphertext and working towards a first byte of the unmasked ciphertext;
a second stage in which an output of the first stage is forward decrypted based at least in part on an output value of a third cascaded chaotic map by beginning with a first byte of the output of the first stage and working towards a last byte of the output of the first stage; and
a third stage in which an output of the second stage is unmasked based on an output value of a fourth cascaded chaotic map to generate a combined message, and in which the combined message is separated into a plurality of bytes and a plaintext.

26. A system comprising:
an encryption module implemented at least in part in hardware, wherein the encryption module is to receive plaintext to be encrypted and encrypt the plaintext using an output value of each of one or more cascaded chaotic maps, wherein each of the one or more cascaded chaotic maps includes multiple chaotic maps each at one of multiple levels, wherein two or more of the multiple chaotic maps in one of the one or more cascaded chaotic maps are different chaotic maps, and wherein for each of the one or more cascaded chaotic maps a first of the multiple chaotic maps at a first of the multiple levels generates an output based at least in part on a key, one or more additional chaotic maps at one or more additional levels of the multiple levels each generates an output based at least in part on an output generated by a chaotic map at a previous level of the multiple levels and at least part of the key, and one of the one or more additional chaotic maps generates the output value; and a decryption module to receive ciphertext and decrypt the ciphertext using the output value of each of the one or more cascaded chaotic maps, and wherein the decrypted ciphertext comprises the plaintext.

27. A system as recited in claim 26, wherein the encryption module is further to encrypt the plaintext using a plurality of stages, the plurality of stages including:
   a first stage in which the plaintext is combined with a plurality of random bytes to generate a combined message, and in which the combined message is masked based on an output value of a first cascaded chaotic map;
   a second stage in which the output of the first stage is forward encrypted based at least in part on an output value of a second cascaded chaotic map, the forward encrypting beginning with a first byte of the output of the first stage and working towards a last byte of the output of the first stage; and
   a third stage in which the output of the second stage is reverse encrypted based at least in part on an output value of a third cascaded chaotic map by beginning with a last byte of the output of the second stage and working towards a first byte of the output of the second stage, and in which the output of the reverse encryption is masked based at least in part on an output value of a fourth cascaded chaotic map.

28. A system as recited in claim 26, wherein the encryption module is further to encrypt the plaintext by:
   generating a forward encrypted message by forward encrypting the plaintext based at least in part on an output value of a first cascaded chaotic map, the forward encrypting beginning with a first byte of the plaintext and working towards a last byte of the plaintext; and
   reverse encrypting the forward encrypted message based at least in part on an output value of a second cascaded chaotic map by beginning with a last byte of the forward encrypted message and working towards a first byte of the forward encrypted message.

29. A system as recited in claim 26, wherein the encryption module is further to:
   use, as at least part of the key for at least one of the one or more cascaded chaotic maps, an output of an additional cascaded chaotic map.

30. A system as recited in claim 26, wherein the decryption module is further to decrypt the plaintext using a plurality of stages, the plurality of stages including:
   a first stage in which the ciphertext is unmasked based at least in part on an output value of a first cascaded chaotic map, and in which the unmasked ciphertext is reverse decrypted based at least in part on an output value of a second cascaded chaotic map by beginning with a last byte of the unmasked ciphertext and working towards a first byte of the unmasked ciphertext;
   a second stage in which an output of the first stage is forward decrypted based at least in part on an output value of a third cascaded chaotic map by beginning with a first byte of the output of the first stage and working towards a last byte of the output of the first stage; and
   a third stage in which an output of the second stage is unmasked based on an output value of a fourth cascaded chaotic map to generate a combined message, and in which the combined message is separated into a plurality of bytes and a plaintext.

* * * * *